US010802390B2

(12) United States Patent
Chapdelaine-Couture et al.

(10) Patent No.: US 10,802,390 B2
(45) Date of Patent: Oct. 13, 2020

(54) SPHERICAL OMNIPOLAR IMAGING

(71) Applicant: VALORISATION-RECHERCHE, LIMITED PARTNERSHIP, Montreal (CA)

(72) Inventors: Vincent Chapdelaine-Couture, Carignan (CA); Sebastien Roy, Montreal (CA)

(73) Assignee: SUOMETRY INC., Montreal (CA)

(*) Notice: Subject to any disclaimer, the term of this patent is extended or adjusted under 35 U.S.C. 154(b) by 264 days.

(21) Appl. No.: 15/572,775

(22) PCT Filed: May 6, 2016

(86) PCT No.: PCT/CA2016/050523
§ 371 (c)(1),
(2) Date: Nov. 8, 2017

(87) PCT Pub. No.: WO2016/179694
PCT Pub. Date: Nov. 17, 2016

(65) Prior Publication Data
US 2018/0143523 A1   May 24, 2018

Related U.S. Application Data

(60) Provisional application No. 62/162,048, filed on May 15, 2015, provisional application No. 62/159,216, filed on May 8, 2015.

(51) Int. Cl.
*G03B 37/04* (2006.01)
*G03B 35/08* (2006.01)
(Continued)

(52) U.S. Cl.
CPC ............ *G03B 37/04* (2013.01); *G03B 35/08* (2013.01); *G06K 9/209* (2013.01); *H04N 13/243* (2018.05);
(Continued)

(58) Field of Classification Search
CPC ...... G03B 37/04; G03B 35/08; H04N 13/271; H04N 13/296; H04N 13/243; G06K 9/209
(Continued)

(56) References Cited

FOREIGN PATENT DOCUMENTS

| JP | 2012165102 A | * | 8/2012 |
| JP | 20121655102 | | 8/2012 |
| WO | WO2014117266 | | 8/2014 |

OTHER PUBLICATIONS

V. Chapdelaine-Couture and S. Roy, "The omnipolar camera: A new approach to stereo immersive capture," IEEE International Conference on Computational Photography (ICCP), Cambridge, MA, 2013, pp. 1-9. (Year: 2013).*

(Continued)

*Primary Examiner* — Sath V Perungavoor
*Assistant Examiner* — Kristin Dobbs
(74) *Attorney, Agent, or Firm* — Norton Rose Fulbright Canada LLP

(57) ABSTRACT

The present disclosure relates to omnipolar imaging for generating a substantially 360 degree by 180 degree stereo spherical view. The omnipolar imaging device comprises at least three wide angle lenses facing in a first direction and at least three wide angle lenses facing in a second direction opposite to the first direction, each lens connected to an image sensor. The lens are positioned so as to capture the substantially 360 degree by 180 degree view. The method of rendering the view comprises, for each pixel in an output image, selecting one set of lenses, i.e. the first set of lenses or the second set of lenses, selecting one lens from the selected set of lenses, and rendering the pixel in an output image from a corresponding point in an input image of the selected lens.

19 Claims, 17 Drawing Sheets

(51) Int. Cl.
  H04N 13/271 (2018.01)
  H04N 13/296 (2018.01)
  H04N 13/243 (2018.01)
  G06K 9/20 (2006.01)

(52) U.S. Cl.
  CPC ......... *H04N 13/271* (2018.05); *H04N 13/296* (2018.05)

(58) Field of Classification Search
  USPC .......................................................... 348/38
  See application file for complete search history.

(56) References Cited

OTHER PUBLICATIONS

Q. Wei, "Converting 2D to 3D: A Survey," Information and Communication Theory Group (ICT), Faculty of Electrical Engineering, Mathematics and Computer Science, Delft University of Technology, the Netherlands, Dec. 2005, pp. 1-37. (Year: 2005).*

V. Chapdelaine-Couture and S. Roy. The omnipolar camera: A new approach to stereo immersive capture. IEEE International Conference on Computational Photography, Apr. 2013.

J. Courbon, Y. Mezouar, L. Eck, and P. Martinet. A generic fisheye camera model for robotic applications. In International Conference on Intelligent Robots and Systems, pp. 1683-1688. IEEE, Oct. 2007.

M. Gong, R. Yang, L. Wang, and M. Gong. A performance study on different cost aggregation approaches used in real-time stereo matching. International Journal of Computer Vision, 75(2):283-296, 2007.

H. Hirschmuller. Stereo vision in structured environments by consistent semi-global matching. In Computer Vision and Pattern Recognition, 2006 IEEE Computer Society Conference on, vol. 2, pp. 2386-2393, 2006.

I. P. Howard and B. J. Rogers. Seeing in Depth. Oxford University Press, USA, 2002.

D. Scaramuzza, A. Martinelli, and R. Siegwart. A flexible technique for accurate omnidirectional camera calibration and structure from motion. In IEEE International Conference on Computer Vision Systems, ICVS '06, pp. 45-, Washington, DC, USA, 2006. IEEE Computer Society.

* cited by examiner

SPHERICAL OMNIPOLAR IMAGING

CROSS REFERENCE TO RELATED APPLICATIONS

The present application is a US National Stage of International Application No. PCT/CA2016/050523, filed on May 6, 2016, which claims priority under 35 U.S.C. 119(e) of U.S. Provisional Patent Application No. 62/159,216 filed on May 8, 2015, and of U.S. Provisional Patent Application No. 62/162,048 filed on May 15, 2015, the contents are hereby incorporated by reference.

TECHNICAL FIELD

The present invention relates to the field of immersive imaging to obtain a fully spherical field of view with depth perception.

BACKGROUND OF THE ART

Traditional stereo imaging uses two cameras separated along a baseline to capture two slightly different viewpoints looking in the same direction. The stereo image pair can then be projected on a stereo display and fused by the human brain to get strong cues to scene depth.

The objective of omnistereo imaging is to provide stereo cues for up to 360 degrees around an observer. Omnistereo images can be used for navigation in a virtual environment without the need to track head orientation.

The difficulty in capturing omnistereo images is that capture cannot simply be done using two cameras side by side. Such a capture would provide maximum stereo information on the median line (perpendicular to the baseline) but not stereo information along the baseline. In addition, distortions and misalignments due to parallax are usually observed in traditional systems, especially when attempting to capture omnistereo images covering a 360 degree by 180 degree field of view.

Therefore, there is a need for an improved setup for capturing omnistereo images.

SUMMARY

The present disclosure relates to omnipolar imaging for generating a substantially 360 degree by 180 degree stereo spherical view. The omnipolar imaging device comprises at least three wide angle lenses facing in a first direction and at least three wide angle lenses facing in a second direction opposite to the first direction, each lens connected to an image sensor. The lens are positioned so as to capture the substantially 360 degree by 180 degree view. The method of rendering the view comprises, for each pixel in an output image, selecting one set of lenses, i.e. the first set of lenses or the second set of lenses, selecting one lens from the selected set of lenses, and rendering the pixel in an output image from a corresponding point in an input image of the selected lens.

In accordance with a first broad aspect, there is provided an imaging device. The device comprises a camera assembly having at least one camera and at least six image sensors, and having a first set of lenses and a second set of lenses operatively connected to the image sensors and arranged to capture a substantially 360 degree by 180 degree field of view. The first set of lenses comprises at least three wide angle lenses at a first baseline height oriented in a first direction, positioned substantially equidistant about a first circle, and arranged to capture input images for a first portion of the field of view. The second set of lenses comprise at least three wide angle lenses at a second baseline height oriented in a second direction substantially opposite to the first direction, positioned substantially equidistant about a second circle substantially concentric with and having a substantially same diameter as the first circle, and arranged to capture input images for a second portion of the field of view, the first portion and the second portion forming the substantially 360 degree by 180 degree field of view. A mounting apparatus retains the camera assembly and the first and second set of lenses in a fixed position.

In some embodiments, the camera assembly comprises three cameras, each one of the three cameras having one lens from the first set of lenses and one lens from the second set of lenses attached thereto, and two of the six image sensors.

In some embodiments, the camera assembly comprises one camera and one image sensor per lens.

In some embodiments, the wide angle lenses are fisheye lenses.

In some embodiments, the device further comprises a computing device operatively connected to the camera assembly. The computing device is configured for generating the substantially 360 degree by 180 degree view by receiving the input images; constructing output images for left and right eye views by, for each pixel of the output images: projecting the pixel from an image coordinate system to a world coordinate system at a scene depth to obtain a world point; determining whether the world point corresponds to the first set of lenses or to the second set of lenses; selecting one lens from the corresponding one of the first set of lenses and the second set of lenses, the selected lens having a camera point in a camera coordinate system that corresponds to the world point; and mapping the corresponding camera point from the selected lens to the pixel. The 360 degree by 180 degree view is rendered from the output images.

In some embodiments, the computing device is further configured for determining the scene depth as one of an estimated scene depth and a parameterized scene depth.

In some embodiments, determining the scene depth comprises determining the scene depth at regions around a transition between the first set of lenses and the second set of lenses.

In some embodiments, determining the scene depth comprises determining a distance at which a sum of pixel differences for pairs of pixels from pairs of lenses is minimized.

In some embodiments, determining whether the world point corresponds to the first set of lenses or to the second set of lenses comprises determining a vertical component of the world point and associating a positive vertical component to first the set of lenses and a negative vertical component to the second set of lenses.

In accordance with another broad aspect, there is provided a method for generating a substantially 360 degree by 180 degree view from images taken by an imaging device. The method comprises acquiring input images from a camera assembly of the imaging device, the camera assembly having at least one camera and at least six image sensors, and having a first set of lenses and a second set of lenses connected to the image sensors, the first set of lenses positioned at a first baseline height substantially equidistantly about a first circle and facing in a first direction, the second set of lenses positioned at a second baseline height substantially equidistantly about a second circle substantially concentric with and having a substantially same diameter as the first circle and facing in a second direction substantially opposite to the first direction. Output images are constructed for left and right eye views by, for each pixel of the output images: projecting the pixel from an image coordinate system to a world coordinate system at a scene depth to obtain a world point; determining whether the world point corresponds to the first set of lenses or to the second set of lenses; selecting one lens from the corresponding one of the first set of lenses and the second set of lenses, the selected lens having a camera point in a camera coordinate system that corresponds to the world point; and mapping the corresponding camera point from the selected lens to the pixel. The 360 degree by 180 degree view is rendered from the output images.

In some embodiments, the method further comprises determining the scene depth as one of an estimated scene depth and a parameterized scene depth.

In some embodiments, determining the scene depth comprises determining the scene depth at regions around a transition between the first set of lenses and the second set of lenses.

In some embodiments, determining the scene depth comprises determining a distance at which a measure of pixel color similarity for groups of at least two pixels from groups of at least two lenses is minimized.

In some embodiments, determining the distance at which the difference is minimized comprises determining the distance for neighboring ones of the pairs of the groups of two or more pixels.

In some embodiments, determining the distance at which the difference is minimized comprises taking into account scale differences between neighboring lenses by adjusting a resolution of images obtained from at least one of the at least two lenses.

In some embodiments, determining the scene depth comprises determining the scene depth at which colors seen by the first set of lenses and the second set of lenses match.

In some embodiments, determining the scene depth comprises using a stereo matching method selected from a group comprising direct matching, dynamic programming, and semi-global matching.

In some embodiments, determining the scene depth comprises selecting the scene depth from a predetermined range of maximum and minimum scene depths.

In some embodiments, determining whether the world point corresponds to the first set of lenses or to the second set of lenses comprises determining a vertical component of the world point and associating a positive vertical component to the first set of lenses and a negative vertical component to the second set of lenses.

In some embodiments, selecting one lens from the corresponding one of the first set of lenses and the second set of lenses comprises determining a horizontal angular position of the world point and selecting the lens for which the horizontal angular position falls into a region of the input image defined by epipolar lines joining a center point of the lens with center points of neighboring lenses In some embodiments, a scene depth may be obtained using a 3D scanning method or a stereo matching method. The stereo matching method may be direct matching, dynamic programming, semi-global matching, or any other stereo matching technique known to those skilled in the art. Alternatively, one or more depth values may be provided manually to represent the scene depth. In some embodiments, an initial scene depth, provided or calculated, may be used and/or subsequently updated in real time using, for example, a stereo matching method.

The present disclosure uses the term "substantially", as in "substantially 360 degree by 180 degree", "substantially equidistant", "substantially concentric", "substantially opposite", and "substantially same diameter", to mean exactly or approximately, such that the intended purpose of the feature is maintained while allowing for slight differences.

BRIEF DESCRIPTION OF THE DRAWINGS

Further features and advantages of the present invention will become apparent from the following detailed description, taken in combination with the appended drawings, in which:

FIG. 4b shows left output images corresponding to the input images of FIG. 4a;

FIG. 4c shows right output images corresponding to the input images of FIG. 4a;

FIG. 9b is a flowchart illustrating the depth estimation step of FIG. 9a.

It will be noted that throughout the appended drawings, like features are identified by like reference numerals.

DETAILED DESCRIPTION

Figure 1A:
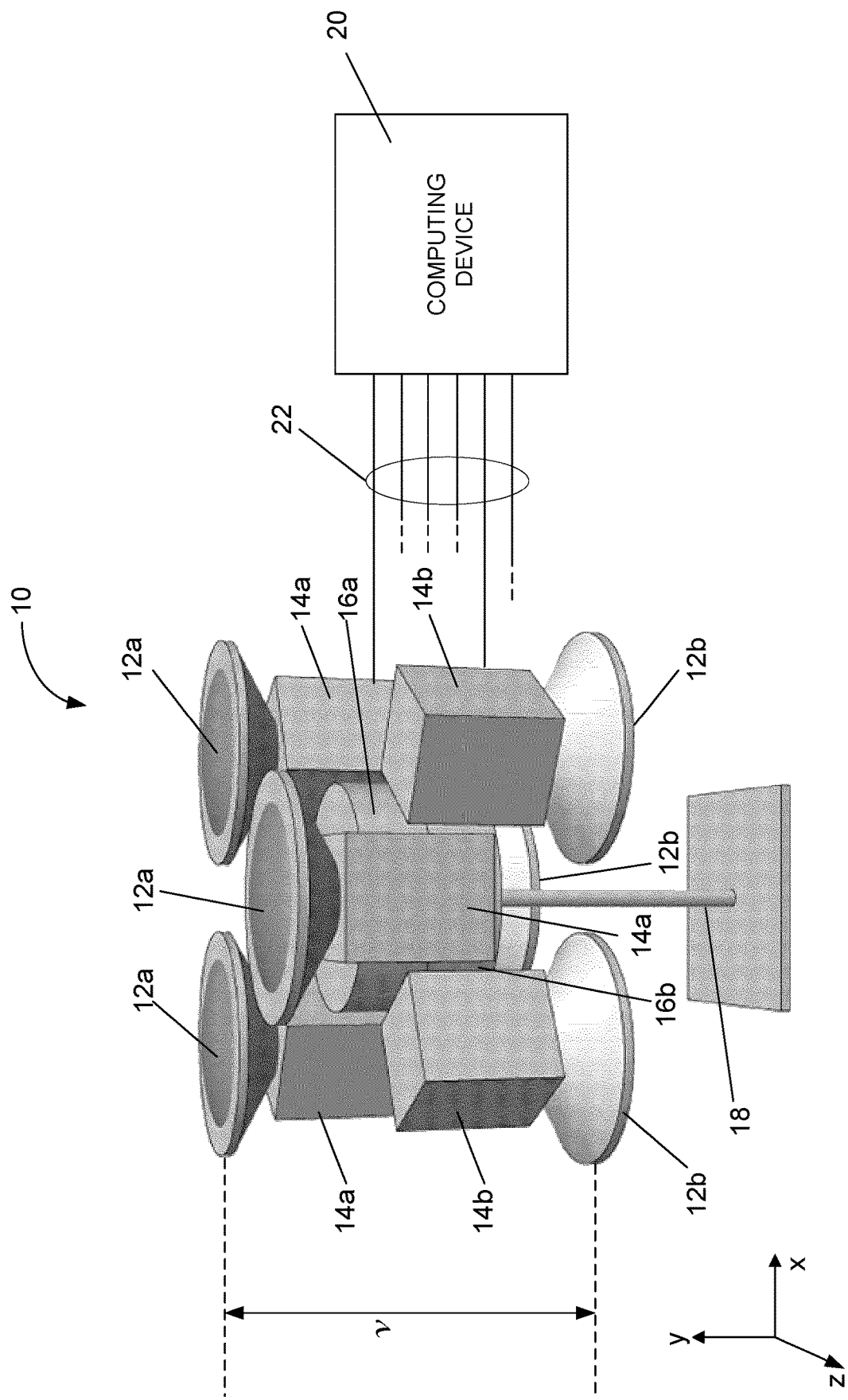
FIG. 1A is a schematic diagram illustrating an exemplary embodiment for a spherical omnipolar imaging device, with one camera housing per lens.

FIG. 1A illustrates an exemplary setup for a spherical omnipolar imaging device 10. The device 10 illustratively combines two hemispherical omnipolar camera setups. The first hemispherical omnipolar camera setup comprises three ultra wide angle lenses 12a, such as fisheye lenses, each mounted onto a corresponding one of three cameras 14a. The second hemispherical omnipolar camera setup comprises three ultra wide angle lenses 12b, such as fisheye lenses, each mounted onto a corresponding one of three cameras 14b. The field of view for each camera 14a, 14b corresponds to 360 degrees/N, where N is the number of cameras used (here N=3 for each hemispherical omnipolar camera setup) so that omnistereo images covering a 360 degree by 180 degree field of view can be captured.

The cameras may be of any type on which an ultra-wide angle lens can be provided in order to capture static and/or video (i.e. dynamic) images. For example, the cameras may be an Allied Vision Mako G-419 camera of 2048×2048 pixel resolution with Fujinon C-mount fisheye lenses, or Canon HFS11 cameras of 1920×1090 pixel resolution with Opteka Vortex fisheye lenses. The cameras 14a are securely fixed onto a first attachment 16a and the cameras 14b are fixed onto a second attachment 16b, with both attachments 16a, 16b being illustratively concentric and resting on a support 18. While illustrated as cylindrical, the attachments 16a, 16b may also have different shapes, provided the top and bottom lenses 12a, 12b lie equidistant about a circle. The attachments 16a, 16b and support 18 may take various forms to ensure a known and fixed relative position of each camera 14a, 14b. For each hemispherical omnipolar camera setup, a single means, such as a three-camera tripod, may be used. The two camera setups may then be attached together via their respective attachments 16a, 16b.

In one embodiment, the spherical omnipolar imaging device 10 comprises a first set of three cameras 14a having lenses 12a facing upwards (also referred to as "top cameras"), such that the lenses 12a capture images from about the height of the lenses 12a and above, and a second set of three (3) cameras 14b having lenses 12b facing downwards (also referred to as "bottom cameras"), such that the lenses 12b capture images from about the height of the lenses 12b and below. Note that the spherical omnipolar imaging device 10 may also be constructed such that the lenses 12a, 12b are facing towards the left and right instead of top and bottom, or angled in opposite directions such as at eleven o'clock and five o'clock or ten o'clock and four o'clock, so as to capture the 360 degree by 180 degree view with two hemispherical views. The stitching method described below may be adapted as a function of the facing direction of the lenses 12a, 12b, as will be understood by those skilled in the art. Upward facing and downward facing lenses are used in the present description for ease of teaching only.

Each camera 14a comprises an image sensor (not shown) for a corresponding lens 12a, and each camera 14b comprises an image sensor for a corresponding lens 12b. The three cameras 14a, 14b of each set of cameras are spaced equally around a circle of diameter d (not shown), with the three cameras 14a being spaced equally around a first circle and the three cameras 14b being spaced equally around a second circle concentric with and having a same diameter as the first circle. It should be understood that there is no constraint on the radius of the circles on which lie the cameras 14a, 14b. This makes practical the use of large camera equipment. Also, the first set of cameras 14a is spaced from the second set of cameras 14b by a vertical distance (or offset) v. Although the cameras 14a, 14b are shown as being placed vertically (i.e. extending along the direction of axis z), it should be understood that the spherical omnipolar imaging device 10 may be positioned such that the cameras 14a, 14b are placed horizontally (i.e. extend along the direction of axis x). It should be understood that other configurations may apply and that more than three cameras may be used for each hemispherical camera setup, provided they are equidistant along a common circle which ideally has a diameter of approximately 65 mm, i.e. the average human eye separation.

Figure 1B:
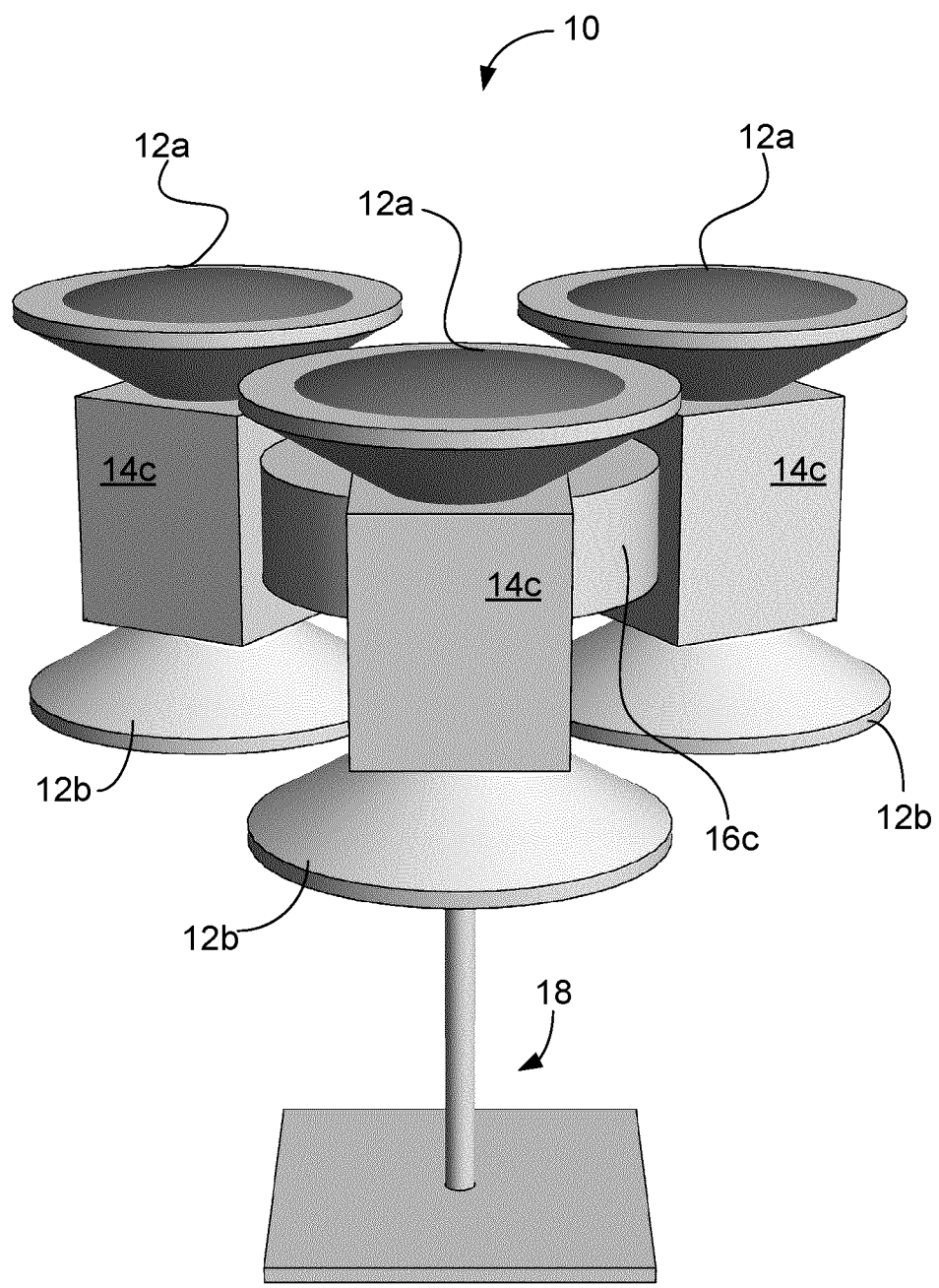
FIG. 1B is a schematic diagram illustrating another exemplary embodiment for the spherical omnipolar imaging device, with one camera housing per pair of lenses.

FIG. 1b illustrates an alternative embodiment for the spherical omnipolar imaging device 10. In this example, three cameras 14c are each provided with an upward facing ultra wide angle lens 12a and a bottom facing ultra wide angle lens 12b. The three cameras 14c are mounted to a single attachment 16c, which sits on support 18. A single camera 14c housing is thus used to operate a pair of lenses 12a, 12b, Each camera 14c comprises two image sensors, one for a corresponding lens 12a and one for a corresponding lens 12b.

In yet another embodiment, illustrated in FIG. 10, a single camera 14d may be used to operate all six lenses 12a, 12b. The lenses 12a, 12b are mounted to the camera 14d in upwarding facing and downward facing directions, respectively. The camera 14d comprises six image sensors, one for each of the six lenses 12a, 12b. The camera 14d is mounted to support 18. The set of cameras 14a, 14b, 14c, 14d may therefore be considered as a camera assembly comprising anywhere from 1 to N individual cameras and N image sensors, where N corresponds to a number of lenses.

Returning back to FIG. 1A, the images captured by the cameras 14a, 14b are transmitted to a computing device 20 via connection means 22, with each connection means 22 connecting a given camera 14a, 14b to the computing device 20. For the embodiment of FIG. 1B, each camera 14c transmits its images, captured from both the upper lens 12a and the lower lens 12b, towards the computing device 20 via a connection means 22. For the embodiment of FIG. 10, camera 14d transmits its images captured from all lenses 12a, 12b towards the computing device 20 via a connection means 22. Note that while illustrated as separate from the system 10, the computing device may also be integrated directly into the system, such as in the camera assembly.

Once received at the computing device 20, the captured images are processed to generate output images for rendering on a display (not shown). As will be discussed further below, processing of the images acquired by the spherical omnipolar imaging device 10 may comprise estimating scene depth. Image stitching, also known as mapping of a pixel from a given camera to a final image, may also be performed using the computing device 20, as will be discussed herein below.

In one embodiment, processing of the captured images may be performed at the computing device 20 in response to one or more input commands being received (e.g. from a user) via a suitable input means (e.g. mouse, keyboard, or the like) provided with the computing device 20. Transmission can occur in real time, i.e. at the time of capture, or at a later time after having saved the captured images on a memory device (not shown). The connection means 22 may be wired, as illustrated, or wireless. Each camera 14a, 14b, 14c, 14d may have an internal clock allowing image acquisition at regular intervals, such as 24, 30, 60 images/second, or the like. Cameras 14c may acquire images from lenses 12a, 12b simultaneously. Camera 14d may acquire images from all lenses 12a, 12b simultaneously. When more than one camera is provided, the internal clocks of all cameras 14a, 14b, 14c may be synchronized together to allow simultaneous image capture by all cameras 14a, 14b, 14c at any given time. Synchronization may be done in various ways, depending on the type of camera used. For example, when using Prosilica 1380 cameras, synchronization may occur via a network connection that links the cameras 14a, 14b, 14c to a computing device (for example computing device 20). When using Canon HFS11 cameras, a wired remote for stereo video and digital stereo photography, such as the LANC Shepherd™, may be used. Other ways of synchronizing the cameras together will be readily understood by those skilled in the art.

The computing device 20 may correspond to one or more server(s) provided remotely and accessible via any type of network, such as the Internet, the Public Switch Telephone Network (PSTN), a cellular network, or others known to those skilled in the art. Any known communication protocols that enable devices within a computer network to exchange information may be used. Examples of protocols are as follows: IP (Internet Protocol), UDP (User Datagram Protocol), TCP (Transmission Control Protocol), DHCP (Dynamic Host Configuration Protocol), HTTP (Hypertext Transfer Protocol), FTP (File Transfer Protocol), Telnet (Telnet Remote Protocol), SSH (Secure Shell Remote Protocol), POP3 (Post Office Protocol 3), SMTP (Simple Mail Transfer Protocol), IMAP (Internet Message Access Protocol), SOAP (Simple Object Access Protocol), PPP (Point-to-Point Protocol), RFB (Remote Frame buffer) Protocol.

Figure 2:
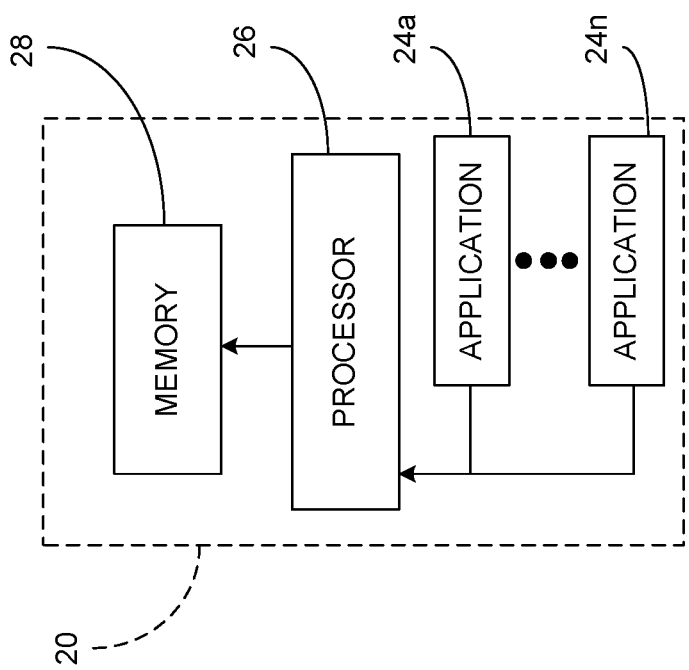
FIG. 2 is a block diagram of an exemplary computing device for processing images captured by the spherical omnipolar imaging device.

As illustrated in FIG. 2, the computing device 20 comprises, amongst other things, a plurality of applications 24a . . . 24n running on a processor 26, the processor 26 being coupled to a memory 28. It should be understood that while the applications 24a . . . 24n presented herein are illustrated and described as separate entities, they may be combined or separated in a variety of ways.

The memory 28 accessible by the processor 26 receives and stores data. The memory 28 may be a main memory, such as a high speed Random Access Memory (RAM), or an auxiliary storage unit, such as a hard disk, flash memory, or a magnetic tape drive. The memory may be any other type of memory, such as a Read-Only Memory (ROM), Erasable Programmable Read-Only Memory (EPROM), or optical storage media such as a videodisc and a compact disc.

The processor 26 may access the memory 28 to retrieve data. The processor 26 may be any device that can perform operations on data. Examples are a central processing unit (CPU), a front-end processor, a microprocessor, a graphics processing unit (GPU/VPU), a physics processing unit (PPU), a digital signal processor, and a network processor. Image stitching can be performed using a Field Programmable Gate Array (FPGA), and/or a GPU on the computing device 20.

The applications 24a . . . 24n are coupled to the processor 26 and configured to perform various tasks, such as processing input images received from the cameras 14a, 14b to generate output images, as explained below in more detail. An output may be transmitted to any type of device, e.g. a display, or stored in a physical storage such as a hard disk or other long term data storage medium.

A projection model, which defines how points in the world are mapped to camera pixels, is determined by assuming that each one of the lenses 12a, 12b is a single viewpoint lens, and that all lenses 12a look in the same direction and all lenses 12b look in the same direction, opposite to the direction of lenses 12a. The projection model may be dependent on the specific camera and lens used. The following assumes that an ideal equisolid fisheye lens is used. The lens positions are also modelled to lie on a unit circle (not shown) parallel to the x-z plane and the up vector of each lens 12a, 12b is assumed normal to the unit circle. A 3D world point $p_w$ in homogeneous coordinates is then mapped to a given lens i using the following model:

$$\text{WorldToCam}_i(p_w) = R_{o_i}^T T_z^{-1} R_b^T R_{y_i}^T p_w \quad (1)$$

where $R_y$ is a rotation matrix with respect to the y-axis that defines the position on the unit circle, $R_b$ is defined as the identity matrix for a lens (as in 12a) facing upwards and as a π rotation around the x-axis for a lens (as in 12b) facing downwards, $T_z$ is a translation of $$\left(0, \frac{v}{2}, \frac{d}{2}\right),$$

and $R_o$ is a rotation matrix setting the 3D orientation of the lens 12a, 12b as mounted to the cameras 14a, 14b, 14c, or 14d and for which the angles relative to the x and z axes are expected to be small.

Let $(o_x, o_y)$ be the principal point (i.e. the image center of a lens 12a or 12b). A point in image space is mapped to a camera pixel following an equidistant projection model for which pixels are directly proportional to angles, as follows:

$$\text{CamToImg}_i(p_c) = R(\phi)(f_i \theta_d, 0)^T + (o_{x_i}, o_{y_i}) \quad (2)$$

where R is a 2D rotation, and where angles $\phi$ and $\theta_d$ are defined as:

$$\phi = \arctan(p_c[y], p_c[x]) \quad (3)$$

$$\theta_d = \theta(1 + \theta^2 k_1 + \theta^4 k_2) \quad (4)$$

$$\theta = \arccos\left(\frac{p_c[y]}{\|p_c\|}\right) \quad (5)$$

where the angle $\theta_d$ represents a distorted value of the angle θ, related to the lens field of view, with distortion coefficients $k_1$, $k_2$ modeled in a polynomial function.

Figure 1C:
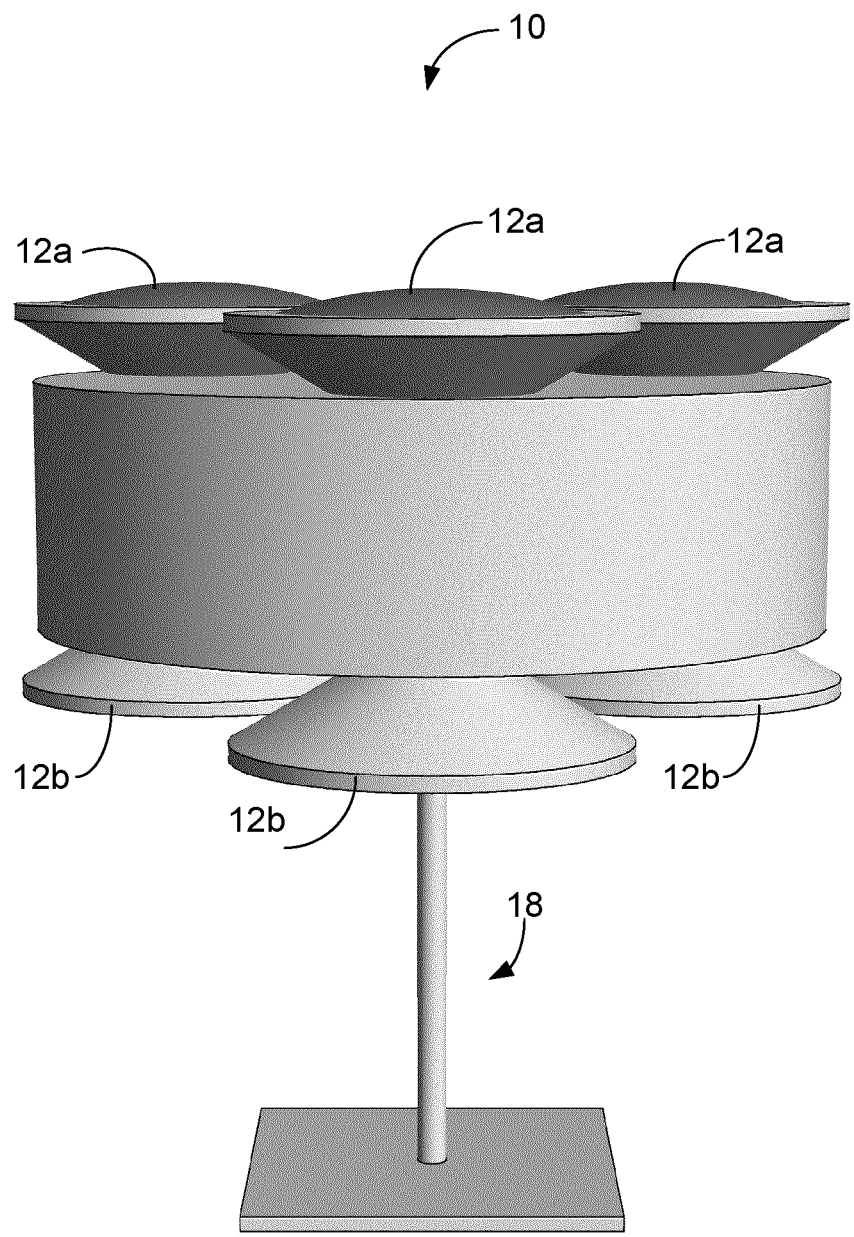
FIG. 1C is a schematic diagram illustrating another exemplary embodiment for the spherical omnipolar imaging device, with one camera housing per six lenses.
Figure 3B:
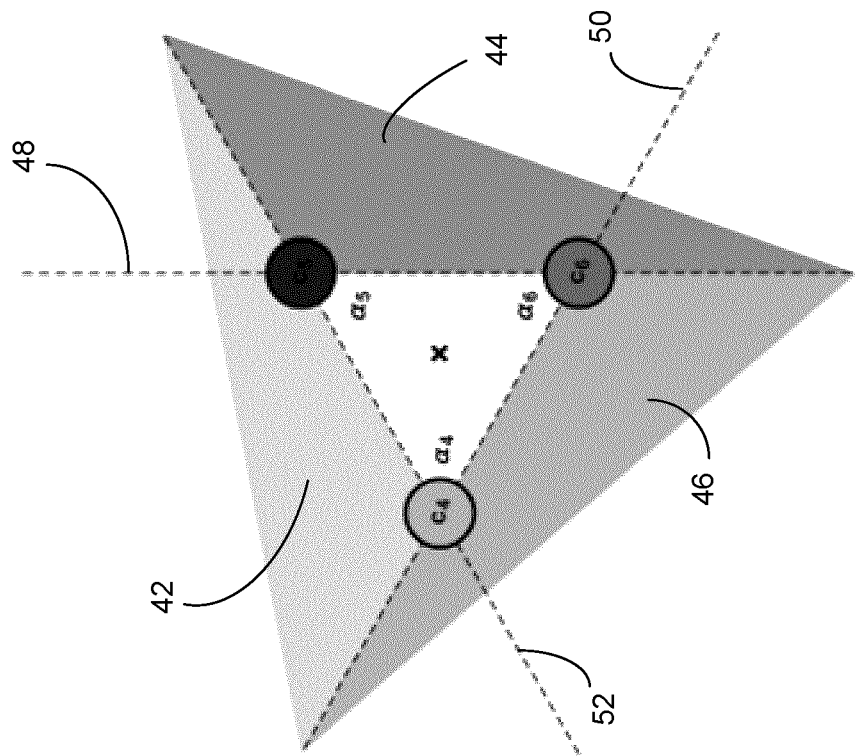
FIGS. 3a-3b show how left omnistereo views are assembled following baselines, using six cameras.
Figure 3A:
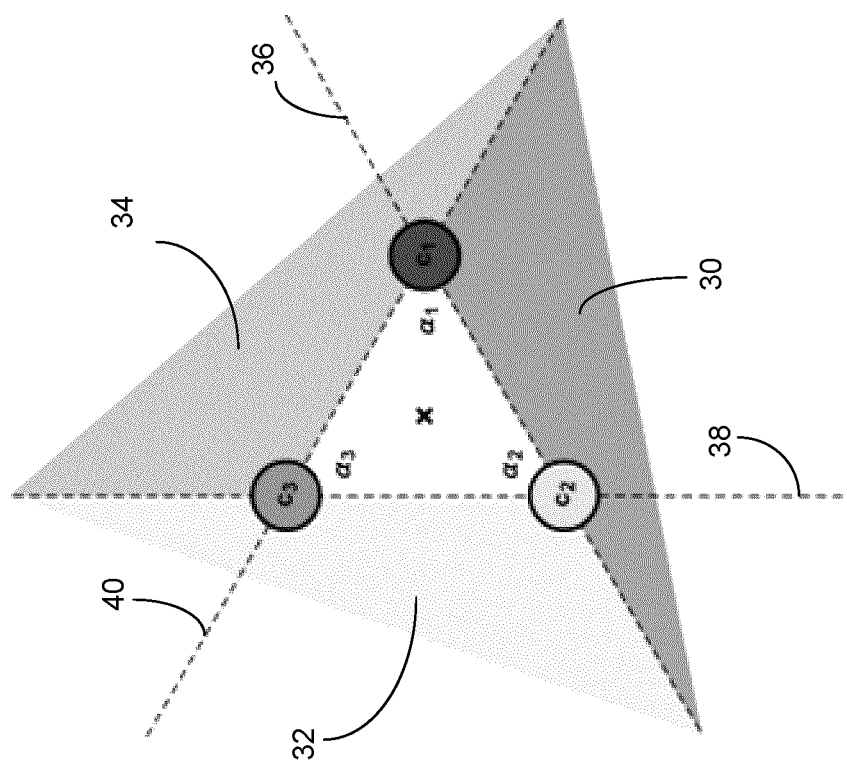
Figure 3D:
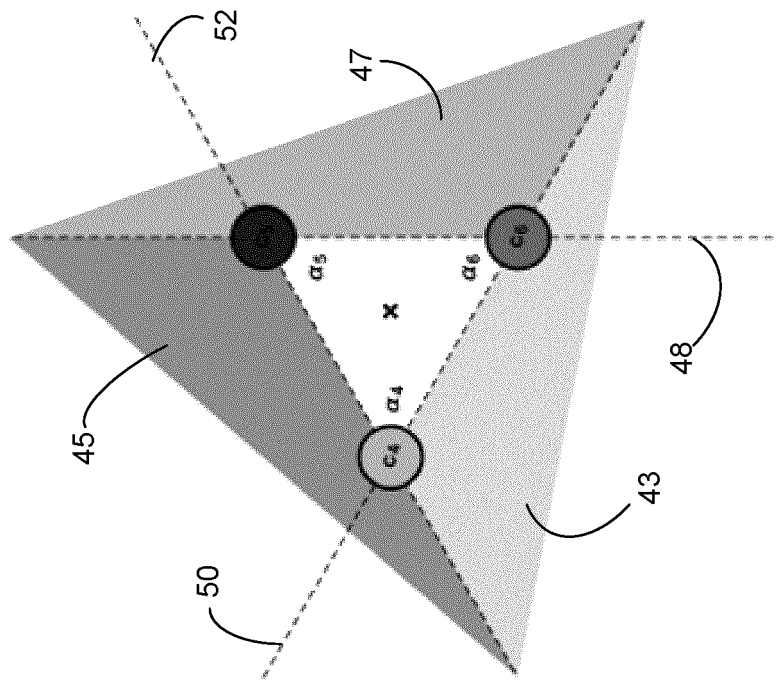
FIGS. 3c-3d show how right omnistereo views are assembled following baselines, using six cameras.
Figure 3C:
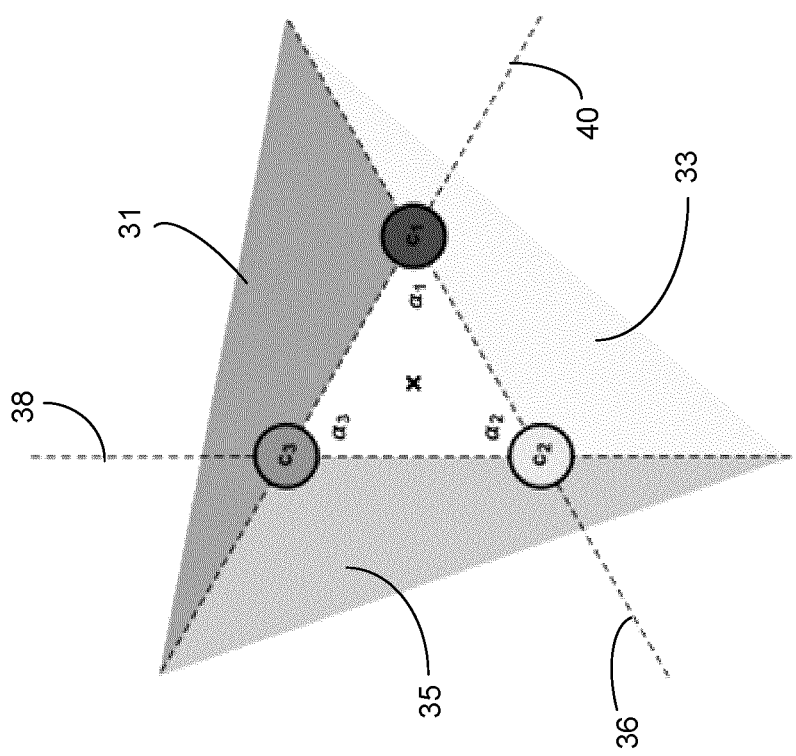

FIGS. 3a to 3d show how left and right omnistereo views can be assembled following baselines, for the spherical omnipolar imaging device 10 of FIGS. 1A, 1B, and 1C. FIG. 3a represents the left eye view of the three top facing lenses 12a (represented in FIG. 3a by $c_1$, $c_2$, $c_3$) and FIG. 3b represents the left eye view of the three bottom facing lenses 12b (represented in FIG. 3b by $c_4$, $c_5$, $c_6$). FIG. 3c represents the right eye view of the three top facing lenses 12a and FIG. 3d represents the right eye view of the three bottom facing lenses 12b.

Referring to FIG. 3a, stitching of the images to obtain a 360 degree view is performed using three distinct field of view regions from lenses $c_1$, $c_2$, and $c_3$ respectively. Region 30 corresponds to a 120 degree view from lens $c_1$, region 32 corresponds to a 120 degree view from lens $c_2$, and region 34 corresponds to a 120 degree view from lens $c_3$. The views are delimited along three lines 36, 38, 40. Line 36 intersects the center point of each one of lenses $c_1$ and $c_2$, line 38 intersects the center point of each one of lenses $c_2$ and $c_3$, and line 40 intersects the center point of each one of lenses $c_1$ and $c_3$. These lines 36, 38, 40 thus pass through the epipolar points of each one of lenses $c_1$, $c_2$, and $c_3$ and are chosen as the stitching locations for three views of 120 degree each, as they represent the point of minimum parallax for each pair of lenses.

Similarly, referring to FIG. 3b, stitching of the images to obtain a 360 degree view is further performed using three distinct field of view regions from lenses $c_4$, $c_5$, and $c_6$ respectively. Region 42 corresponds to a 120 degree view from lens $c_4$, region 44 corresponds to a 120 degree view from lens $c_5$, and region 46 corresponds to a 120 degree view from lens $c_6$. The views are delimited along three lines 48, 50, 52. Line 48 intersects the center point of each one of lenses $c_5$ and $c_6$, line 50 intersects the center point of each one of lenses $c_4$ and $c_6$, and line 52 intersects the center point of each one of lenses $c_4$ and $c_5$. These lines 48, 50, 52 thus pass through the epipolar points of each one of lenses $c_4$, $c_5$, and $c_6$ and are chosen as the stitching locations for three views of 120 degree each.

As used herein the term "epipoles" or "epipolar points" refers to the intersections between the captured images and the baseline joining two lens positions. Regardless of the number of lenses (or cameras) used, two lines passing through each lens and its two neighboring lenses on the circle are defined. Thus, the two lines passing through a lens divide its 360 degree field of view into four parts. When using three lenses, two parts have a 120 degree field of view and two parts have a 60 degree field of view. Only the 120 degree parts are illustratively used, one to produce the left view and the other to produce the right view. Formally, the parts that are used are defined by Equation (9) below.

In FIGS. 3c and 3d, the field of view used for each lens corresponds to a 180 degree rotation of the field of view used in FIGS. 3a and 3b, respectively. Referring to FIG. 3c, region 31 corresponds to a 120 degree view from lens $c_1$, region 33 corresponds to a 120 degree view from lens $c_2$, and region 35 corresponds to a 120 degree view from lens $c_3$. The views are still delimited along three lines 36, 38, 40, but the field of view of each one of lenses $c_1$, $c_2$, and $c_3$ selected for stitching to create the 360 degrees view differ from those for the left eye as illustrated in FIG. 3a. Similarly, in FIG. 3d, region 43 corresponds to a 120 degree view from lens $c_4$, region 45 corresponds to a 120 degree view from lens $c_5$, and region 47 corresponds to a 120 degree view from lens $c_6$. The views are still delimited along three lines 48, 50, 52, but the field of view of each one of lenses $c_4$, $c_5$, and $c_6$ selected for stitching to create the 360 degrees view differ from those for the left eye as illustrated in FIG. 3b.

Once images have been captured by the cameras through the lenses (e.g. $c_1$, $c_2$, $c_3$, $c_4$, $c_5$, $c_6$) or once the images have been assembled from the parts as in FIGS. 3a, 3b, 3c, and 3d, it is possible to decide which one is for the left eye or right eye as follows. Any point on the scene observed from point 'X' (representative of the position of an ideal observer at the center of the screen) is viewed by two possible lenses. If the lens by which the scene is viewed is located counter-clockwise from the line of sight (X to the scene point), then the image is for the left eye. If the lens is located clockwise, then this image is for the right eye. FIGS. 3a and 3b are therefore for the left eye while FIGS. 3c and 3d are for the right eye.

Figure 4A:
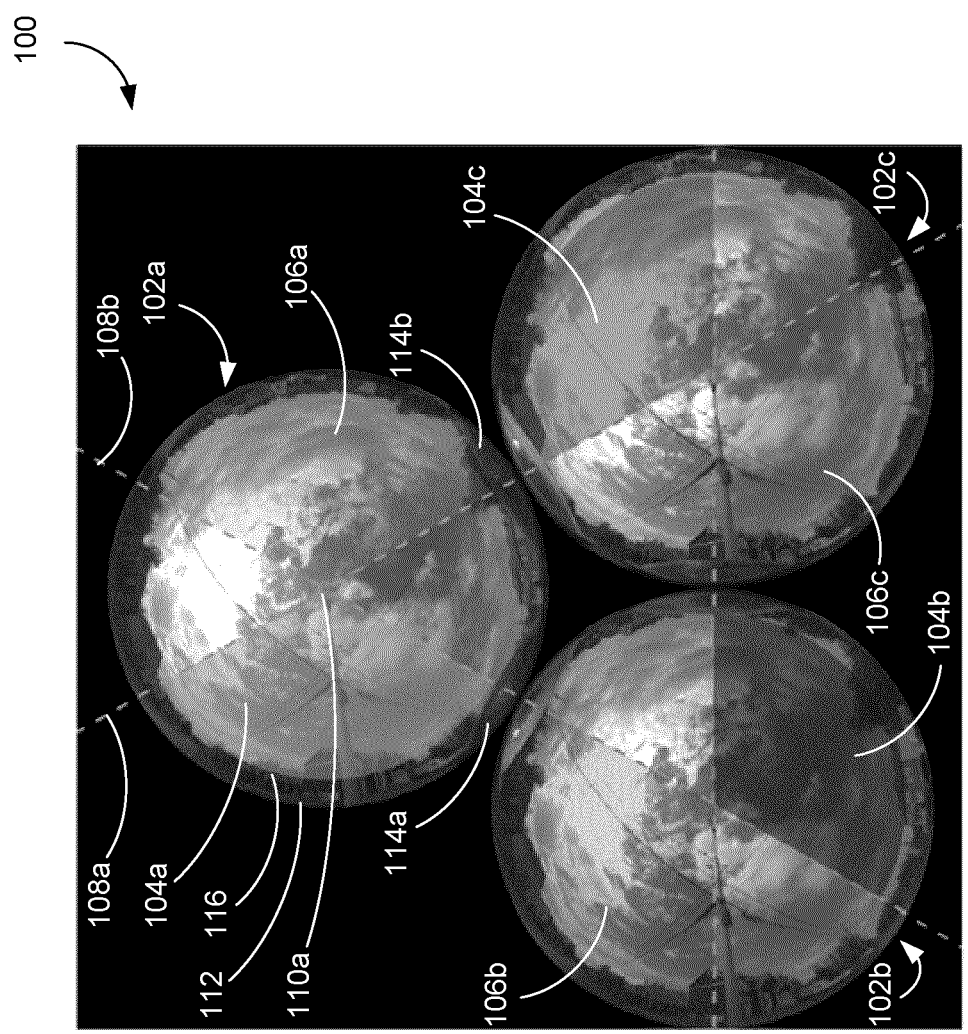
FIG. 4a shows an input image for each camera in a hemispherical omnipolar setup composed of three cameras.

FIG. 4a illustrates input images 102a, 102b, and 102c captured by each one of three lenses (e.g. cameras $c_1$, $c_2$, $c_3$ of FIG. 3a or cameras $c_4$, $c_5$, $c_6$ of FIG. 3b) of a given hemispherical three-lens setup. For each input image 102a, 102b, or 102c, the image regions 104a, 104b, 104c and 106a, 106b, 106c are selected for stitching and used to produce an omnistereo pair of images. In particular, a given image as in 102a comprises regions 104a, 106a, with each region 104a or 106a spanning about 120 degrees and being delimited by the lines 108a and 108b that respectively join the center point 110 of the lens (as in not shown) having captured the image and the center points of neighboring lenses (as in $c_2$ and $c_3$). As discussed above with reference to FIGS. 3a, 3b, 3c, and 3d, the regions 104a, 104b, 104c are used to produce the image for the left eye and the regions 106a, 106b, 106c are used to produce the image for the right eye.

If none of the remaining lens is visible in the captured image, each image region 104a, 104b, 104c, 106a, 106b, 106c may have a border that corresponds to (i.e. follows) the lines 108a, 108b starting from the center point 110 until a perimeter 112 of the image 102a is reached. However, since the lenses $c_1$, $c_2$, $c_3$, $c_4$, $c_5$, $c_6$ have a wide vertical field of view, for each image as in 102a, 102b, 102c captured by a given lens $c_1$, $c_2$, or $c_3$ (if considering the upwards-facing hemispherical camera setup) or $c_4$, $c_5$, or $c_6$ (for the downwards-facing hemispherical camera setup), the two remaining lenses may be visible in the captured image. This can be seen in FIG. 4a, where lenses 114a and 114b are visible in image 102a. In this case, each region 104a, 104b, 104c, 106a, 106b, 106c may be delimited so that it expands radially from the center point 110 but has an edge 116 that does not match the perimeter 112 of the image as in 102a. In particular, the region 104a, 104b, 104c, 106a, 106b, or 106c may be expanded radially from the center point as in 110 towards the image perimeter as in 112 but expansion of the region is stopped before the reproductions of the two visible lenses as in 114a, 114b are reached. For example, regions 104a and 106a extend away from the center point 110 of image 102a without reaching the image perimeter 112. In this manner, self-occlusion, i.e. one lens occluding another one, is avoided and it can be ensured that the final omnistereo pair of images do not contain the image of any visible lenses 114a, 114b. However, this reduces the output field of view (e.g. the overall area of the left and right output images). Indeed, the portion of the field of view of input images 102a, 102b, 102c, in which visible lenses as in 114a, 144b can be seen, is removed from the resulting left and right output images.

Figure 4B:
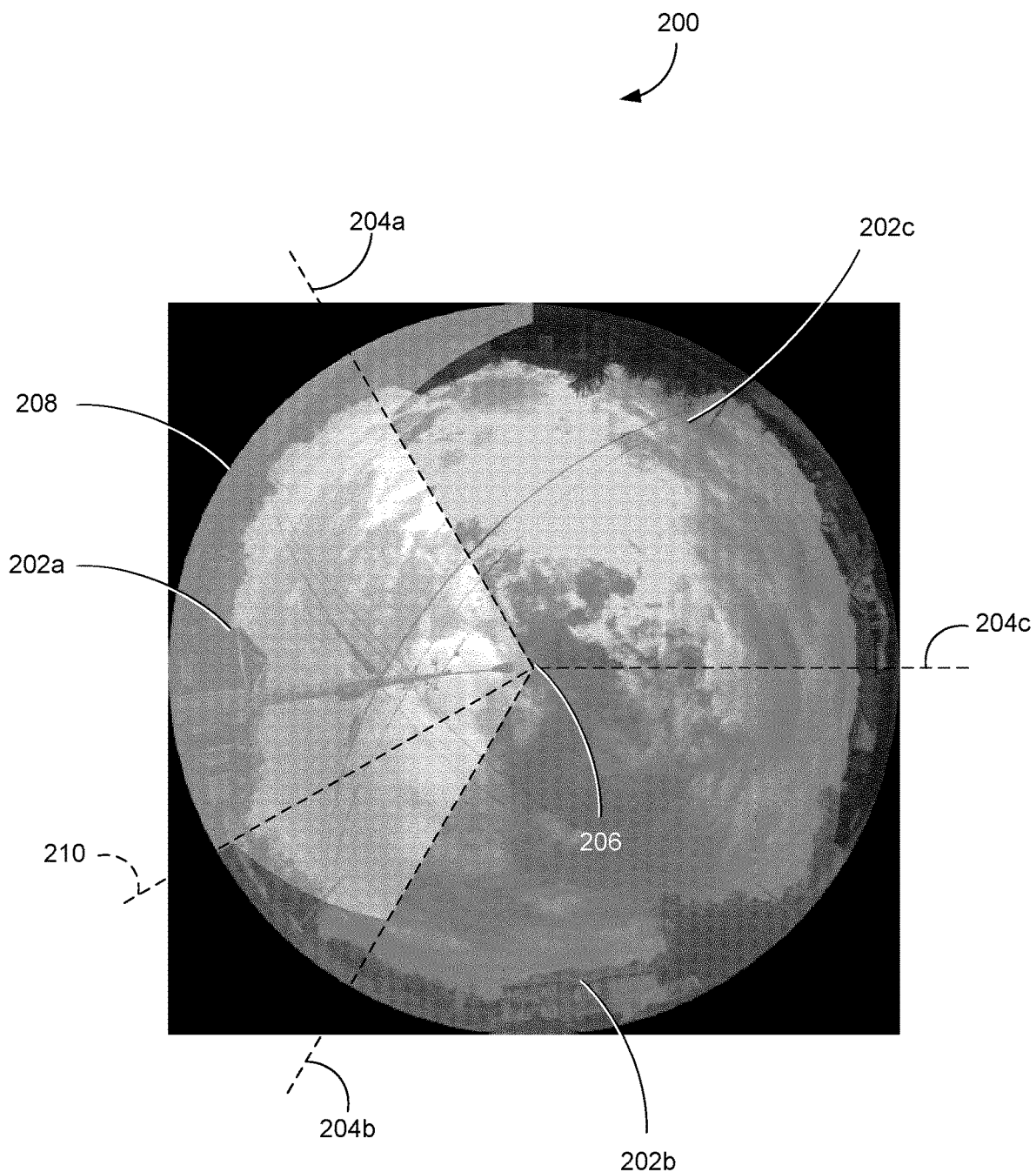
Figure 4C:
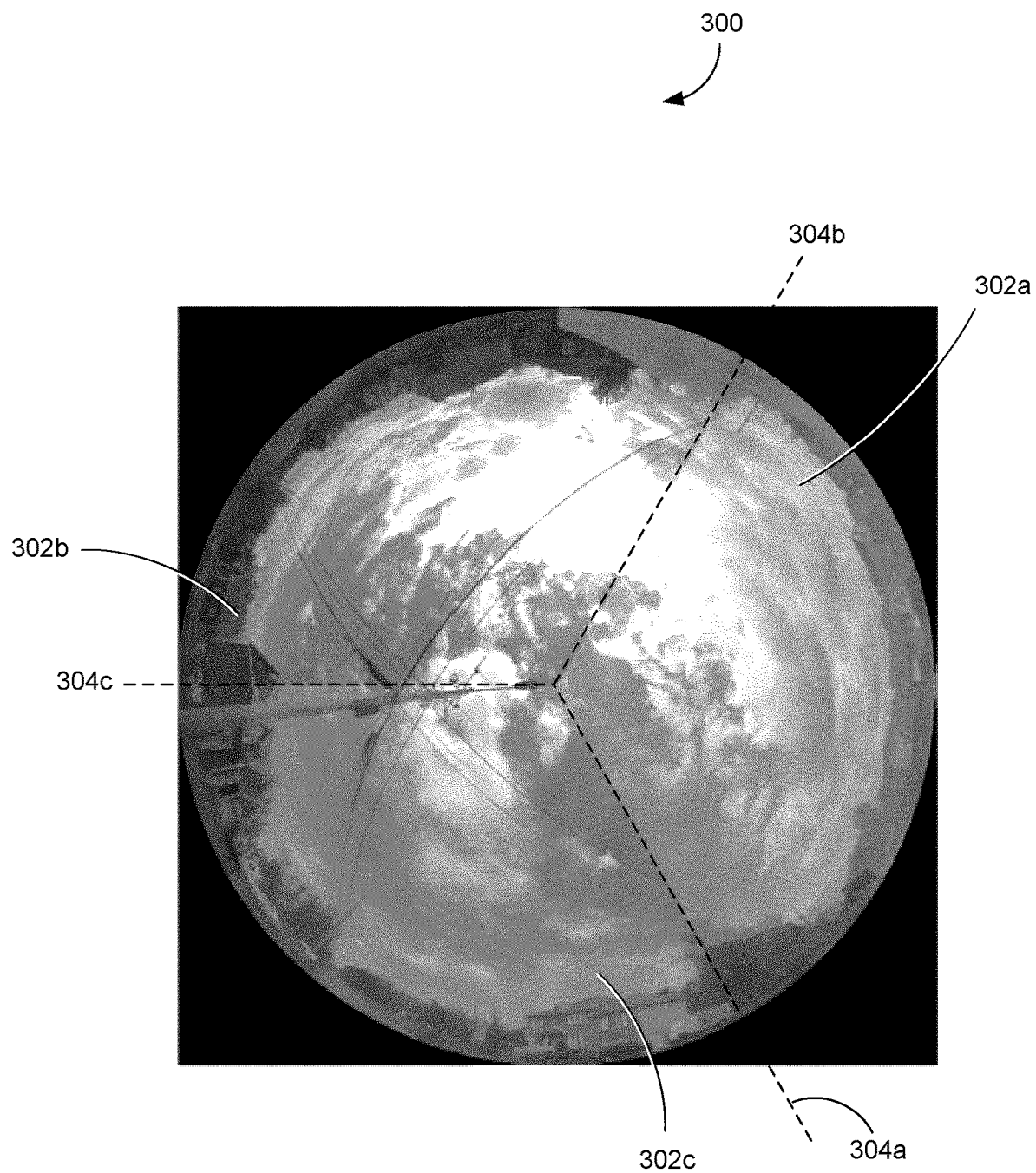

In order to increase the output field of view, the shape of regions 104a, 104b, 104c, 106a, 106b, 106c defined for each input image 102a, 102b, 102c may alternatively be modified to obtain new regions 202a, 202b, 202c, as illustrated in FIG. 4b, and 302a, 302b, 302c, as illustrated in FIG. 4c, where FIG. 4b illustrates the left output image (or view) 200 and FIG. 4c the right output image (or view) 300, which correspond to the input images shown in FIG. 4a. In this embodiment, the borders (not shown) of the regions 202a, 202b, 202c, 302a, 302b, 302c are delimited only in part by the lines (as in 204a, 204b, and 204c in FIG. 4b and 304a, 304b, and 304c in FIG. 4c), which intersect the center points of neighboring lens pairs. In particular, each region 202a, 202b, 202c, 302a, 302b, 302c extends radially from the image center point (as in 206 in FIG. 4b) towards the image edge (as in 208 in FIG. 4b) but their borders deviate from these lines once lenses (references in 114a, 144b in FIG. 4a) become visible in the image. Therefore, each image region border may comprise a first section (not shown) that corresponds to (e.g. follows) a line (as in 204a, 204b, and 204c in FIG. 4b and 304a, 304b, and 304c in FIG. 4c) and a second section that deviates away from the line (starting from a point where a reproduction of a neighboring lens is visible until the image's perimeter is reached) so as to remove from the image region a shape corresponding to the reproduction of the visible lens. As the deviation illustratively depends on the camera setup, the deviation process may be defined once, in a pre-processing step.

It should be understood that the deviations are performed so as to get around visible lenses and the shape of the deviations may accordingly depend on the shape of the visible lens to be removed. In particular, the shape of the deviation may follow the shape of the visible lens. Alternatively, the deviation may be performed so that the borders of the image region deviate from the lines (as in 204a, 204b, and 204c in FIG. 4b and 304a, 304b, and 304c in FIG. 4c) by predetermined angles and/or heights. For instance, as can be seen in FIG. 4a, a first or left border (not shown) of region 202b deviates from the line 204b (that joins the center point 206 of the lens, e.g. lens $c_1$, having captured the image to the center point of a neighboring lens, e.g. lens $c_2$) so that region 202b does not include a reproduction of lens $c_2$, the shape of the reproduction being removed from region 202b. A given angle (e.g. 20 degrees, not shown) may then be formed between the line 204b and a line 210 joining the center point of lens $c_1$ and a point (not shown) at which the deviated first border of image region 202b reaches the perimeter 208. Still, it should be understood that it is desirable to minimize the amount (e.g. angle) of deviation from a given line (as in 204a, 204b, and 204c in FIG. 4b and 304a, 304b, and 304c in FIG. 4c).

In order to compensate for removal of reproductions of visible neighboring lenses, i.e. for the deviation from the lines 204a, 204b, 204c, 304a, 304b, 304c at a given (e.g. left) border of a region 202a, 202b, 202c, 302a, 302b, 302c, deviation is also performed at the other (e.g. right) border of the region to add to the region in question an image portion corresponding to the shape of the visible lens removed from the image portion. For example, the second or right border (not shown) of region 202b is also made to deviate from the line 204c. It should be understood that, for any given image region as in 202b, the shape (e.g. curvature or other geometry) of the deviation performed at the first border is the same as the shape of the deviation performed at the second border, with both the first and second borders illustratively having the same length. Also, both the first and the second border of image region 202b illustratively deviate from their corresponding line 204b, 204c by a same angle (e.g. 20 degrees). The stitching method for a hemispherical three-lens setup is described in U.S. patent Ser. No. 14/817,150, the entire contents of which are hereby incorporated by reference.

Rendering of an omnistereo pair of images that can be used as input for a head-mounted display or a spherical screen centered at a point 'X' using the six lens setup of FIGS. 3a, 3b, 3c, and 3d and angles $\alpha_1, \alpha_2, \alpha_3, \alpha_4, \alpha_5, \alpha_6$ between two consecutive baselines is as follows. The baseline between pairs of lenses define epipoles which are used for stitching without any horizontal misalignments due to parallax. The ideal observer is assumed to be at the center of the screen so the external matrices (rotation and translation matrices) of the output images are set to be identity matrices. The output distortion coefficients $k_1$ and $k_2$ are also set to 0.

The image for the left eye in an omnistereo spherical screen is first considered. Assuming that the scene is a sphere of radius $Z_s$, a pixel p=(x, y) is first projected to image space as follows:

$$ImgToCam_i(p) = \Omega_y(\phi)\Omega_z(\theta)(0, 1, 0)^T \text{ where:} \tag{6}$$

$$\phi = \arctan(y - o_{y_i}, x - o_{x_i}) \tag{7}$$

$$\theta = \frac{\|(x - o_{x_i}, y - o_{y_i})\|}{f_i} \tag{8}$$

Figure 5A:
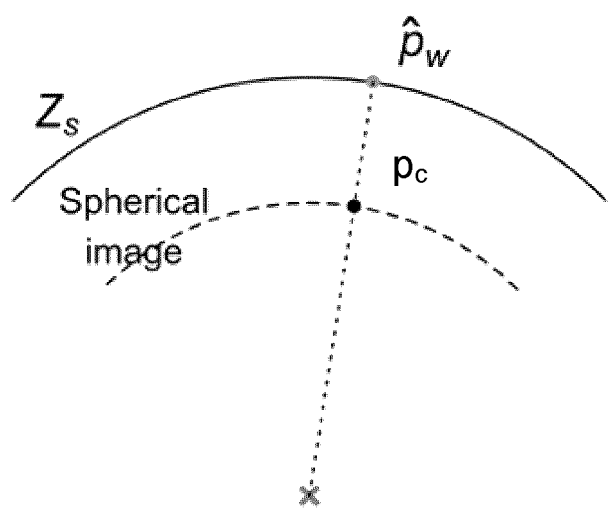
FIGS. 5a-5c illustrate the process for rendering of an omnistereo image for a head-mounted display or spherical screen and distortions that may occur in the rendered position on the screen.

The camera point $p_c$ in homogeneous coordinates on a unit sphere is then projected to the world at $\hat{p}_w$, as illustrated in FIG. 5a, as follows:

$$CamToWorld_i(p_c, Z) = R_{y_f} R_b T_z R_{o_f} Z p_c \tag{9}$$

with $R_y$, $R_b$, $T_z$, and $R_o$ defined above with reference to Equation (1). In other words, the pixel p is estimated to be located at $\hat{p}_w$, at a depth $Z=Z_s$. If the vertical component y of $\hat{p}_w$ is positive, the world point $\hat{p}_w$ is rendered using upwards-facing lenses 12a. If the vertical component y of $\hat{p}_w$ is negative, the world point $\hat{p}_w$ is rendered using downwards-facing lenses 12b.

Considering that y is positive, let $w_i$ be the horizontal angular position of point $\hat{p}_w$ in lens i (or $c_i$), given by:

$$w_i = \arctan(\hat{p}_w[z] - c_i[z], \hat{p}_w[x] - c_i[x]) \tag{10}$$

Lens i is selected to draw $\hat{p}_w$ only if $w_i$ is within $[\gamma_{i-1}, \gamma_i]$, where $\gamma_i$ are angles defined as:

$$\gamma_i = \gamma_{i-1} + \pi - \alpha_i \tag{11}$$

with $\gamma_0 = 0$ corresponding to the direction of the line joining lenses $c_1$ and $c_N$.

Figure 5B:
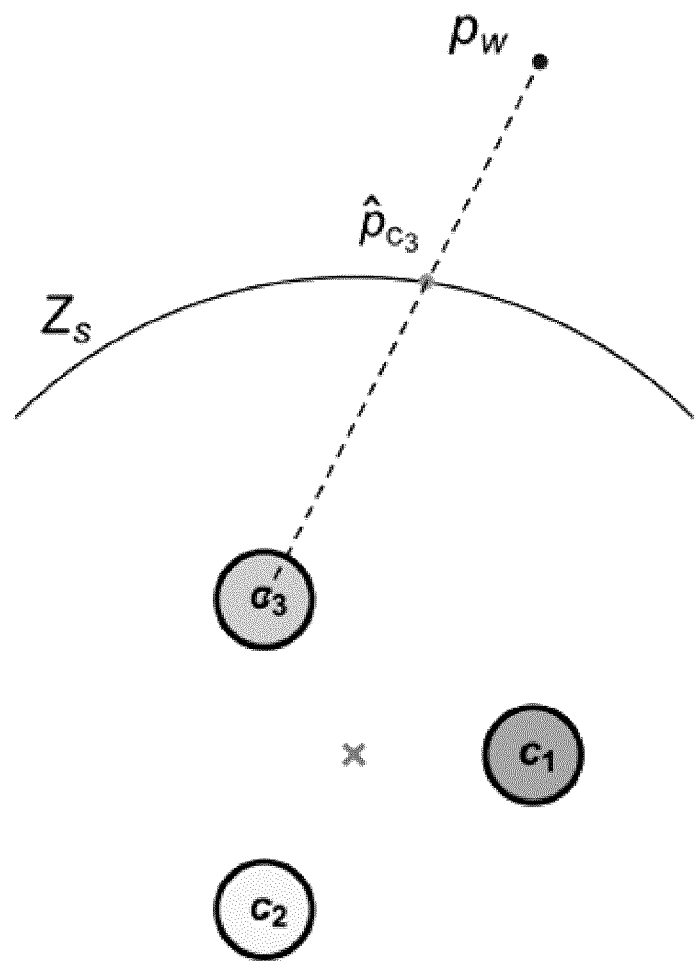
Figure 5C:
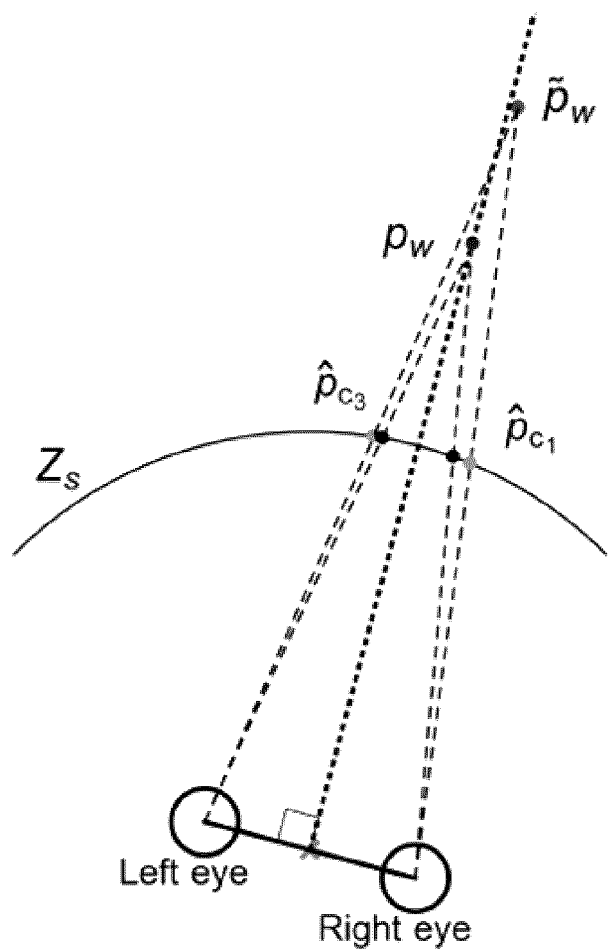

FIG. 5b illustrates that lens $c_3$ is selected to draw the world point $\hat{p}_w$ for the left omnistereo view, and the visible scene point $p_w$ is rendered. However, the world point $p_w$ may not actually be at depth $Z_s$. This is seen in FIG. 5c, which shows that the scene point $p_w$ is perceived to be located at $\tilde{p}_w$, a perception distortion caused by the fact that $p_w$ is not in reality located at the assumed depth $Z_s$ when an observer (assumed to be at the center of the screen) is looking straight at $p_w$. It can be seen that the distortion is small with respect to spatial orientation, but is more significant in depth.

In particular, each image in the omnistereo pair has a number of monocular seams that correspond to the number of lenses. In the present case, each hemispherical image in the omnistereo pair has three (3) monocular seams. By using vertical stitching planes passing through the epipoles, there are no horizontal misalignments at the seams induced by parallax. However, any deviation from the epipolar planes, such as deviations to avoid lens auto-occlusions (as discussed above with reference to FIGS. 4a, 4b, and 4c), may introduce some horizontal misalignments due to parallax if scene depths are not well estimated. In addition, horizontal misalignments may also affect the horizontal seam if the bottom cameras as in 14b are not horizontally aligned with the top cameras as in 14a, as shown in FIG. 1A. Note that this is not an issue when using the embodiment of FIG. 1B, as the top facing lenses 12a are aligned with the bottom facing lenses 12b through cameras 14c.

Figure 6A:
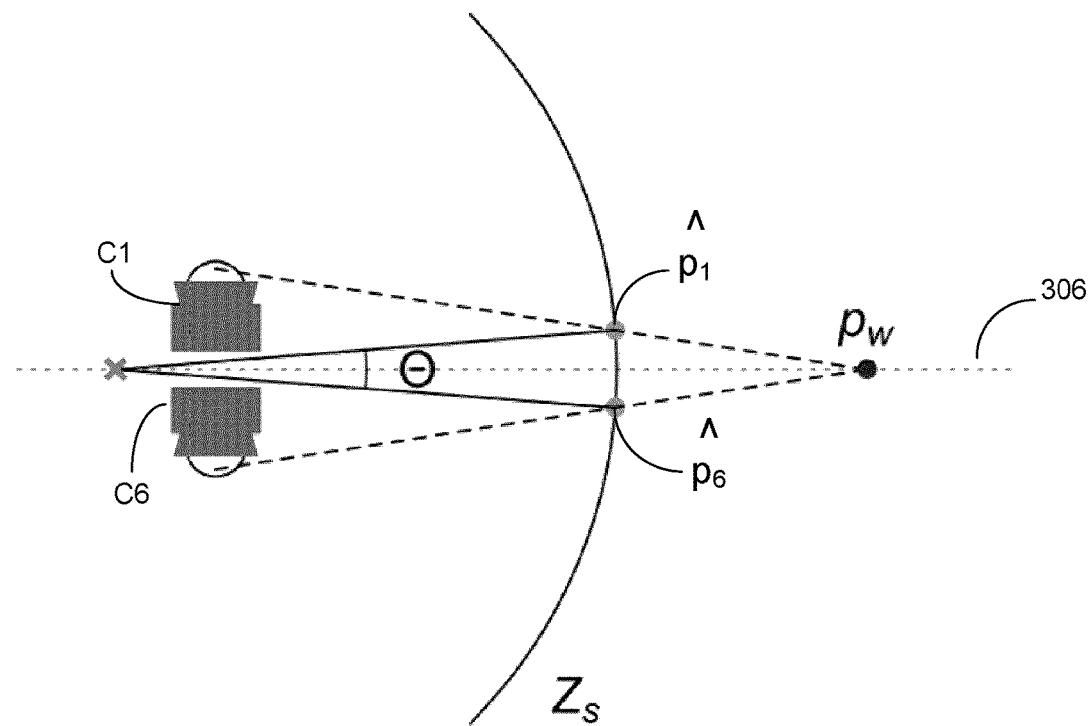
FIGS. 6a-6b illustrate vertical misalignments visible at the horizontal seam between two hemispherical image parts.
Figure 6B:
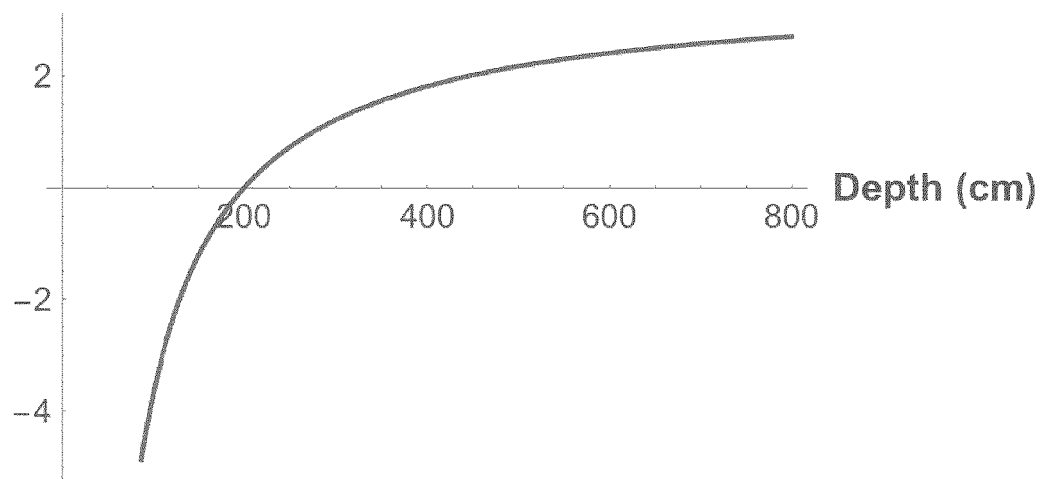
Figure 7A:
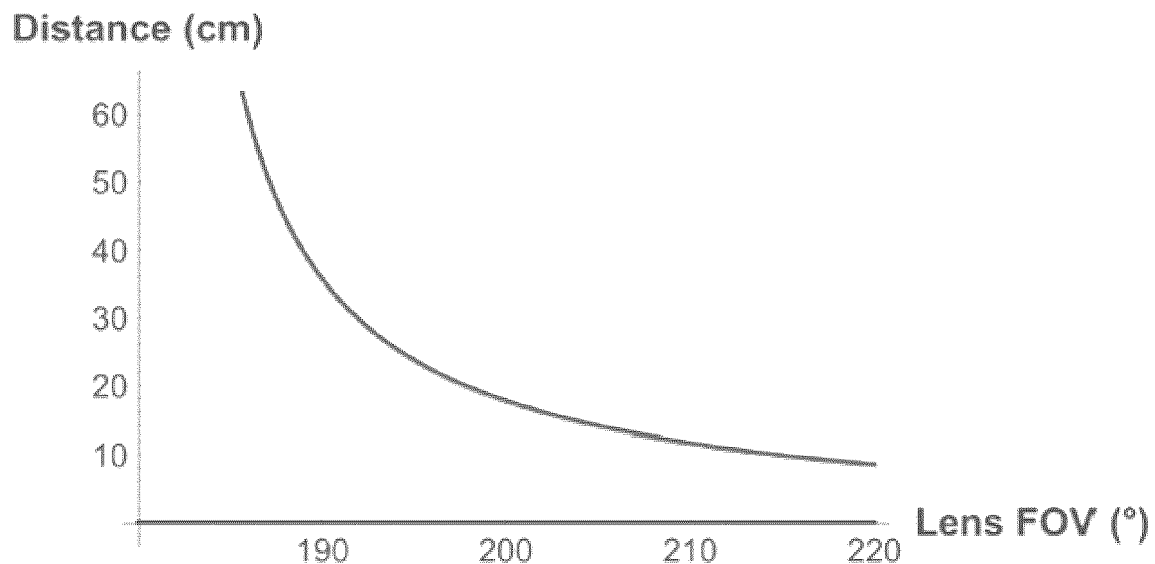
FIGS. 7a-7b is an exemplary graphical representation of the distance from the cameras at which ends the blind region on the horizontal plane, with respect to the field of view of the lenses (7a) and the vertical offset between the cameras (7b)
Figure 7B:
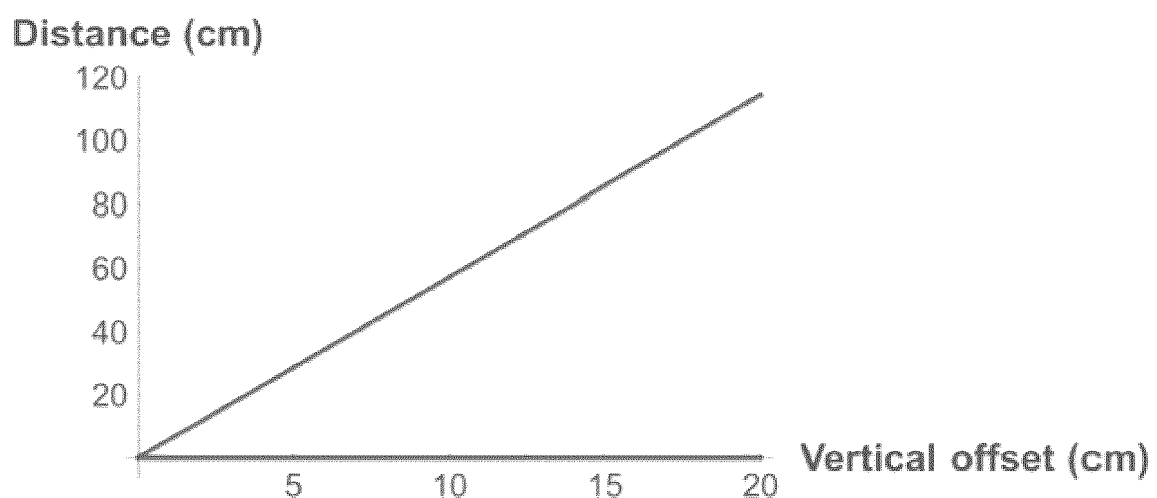

There may be vertical misalignments for points at a different height than the cameras. Vertical misalignments may also be visible at the horizontal seam between two hemispherical image parts. In particular, FIG. 6a shows the projection model at the horizontal stitching seam. This model considers the points visible at eye level (represented by the dotted line 306) of the ideal observer (represented by the "X"). Ignoring occlusions by other points, both the top and bottom cameras also see the point Pw along some ray (represented by the dashed lines). When Pw is not located on the scene model (here a sphere of radius Zs), then the rays intersect the scene model at different projection points $\hat{p}_1, \hat{p}_6$, depending on the lens $c_1, c_6$, from which the ray is drawn, thus creating vertical parallax proportional to the angular distance θ between them (as seen by the ideal observer). FIG. 6b shows the magnitude of the vertical parallax in degrees, for an assumed depth of $Z_s$=200 cm. Closer scene points near eye level are also not captured by any lens, for various lens field of views (as shown in FIG. 7a), and various vertical offsets v between the cameras (as shown in FIG. 7b), resulting in a blind region on the horizontal plane. For instance, as can be seen from FIGS. 7a and 7b, for lenses with a 190 degree field of view and a vertical offset of v=12.5 cm, scene points near eye level and closer than 60 cm are not captured.

The above-mentioned misalignments cause perceptual stereo distortions, which may be computed at the center of the visual system. These distortions depend on the depth $Z_s$ as well as on the camera circle diameter d. In one embodiment, the camera circle diameter d is fixed to 7.5 cm, a value slightly larger than the average human eye separation of camera circle diameter b=6.5 cm, in order to compensate for omnipolar stitching which perceptually flattens out the range of depths in the scene. For any scene point $p_w$, it is assumed that an observer located at the center of a dome display or spherical screen is looking straight at it. As illustrated in FIG. 5c, one can then measure where the scene point $p_w$ is perceived, i.e. distorted. The location of the eyes is given by $$R_y(\alpha)\left(\pm \frac{b}{2}, 0, 0\right)^T,$$

where α is the orientation of the eye baseline given by α=arctan($p_w[x]$, $p_w[z]$).

Figure 8:
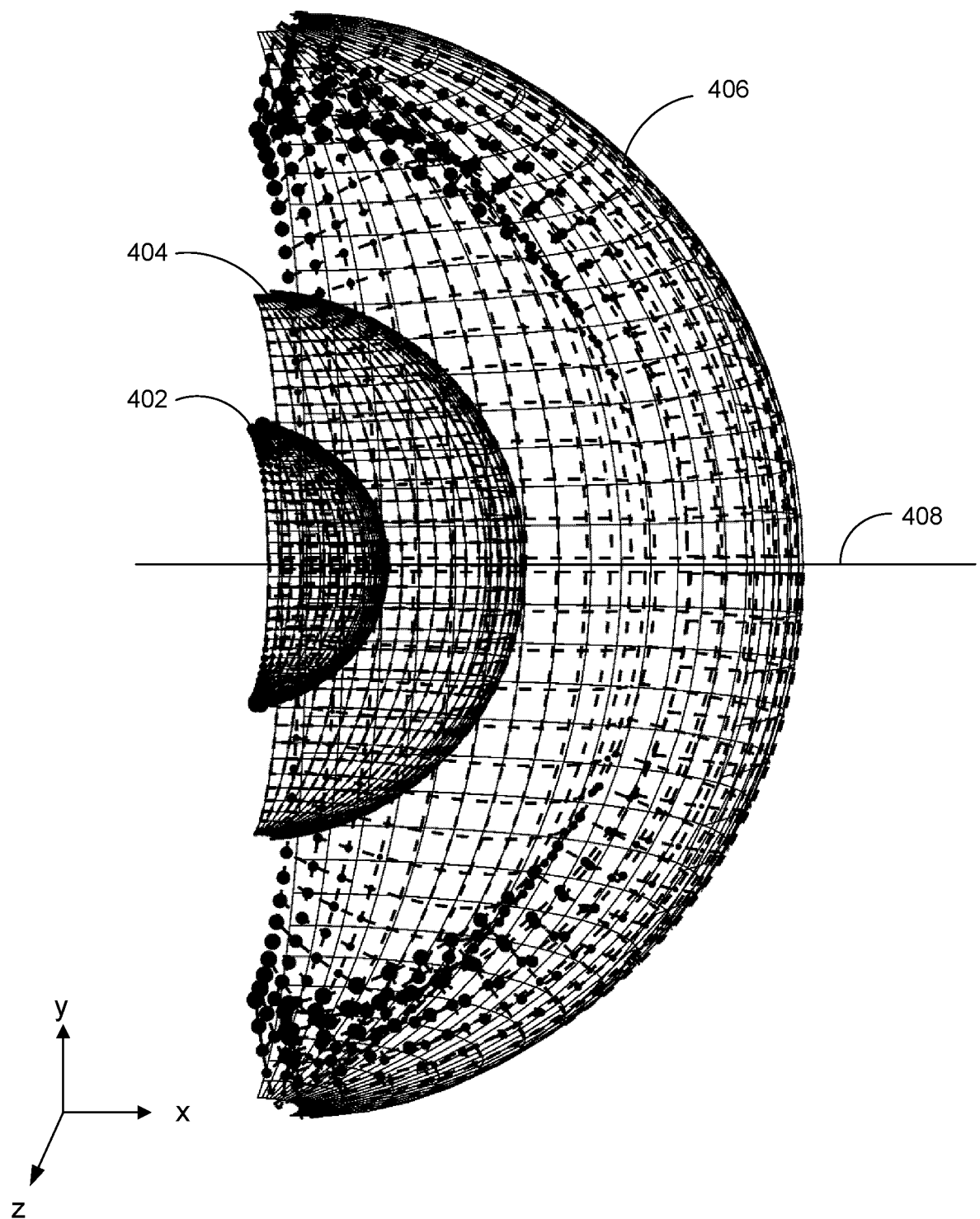
FIG. 8 is an exemplary graphical representation of distortions for points lying on three spheres with a radius of 100 cm, 200 cm, and 400 cm, respectively.

FIG. 8 illustrates how points are distorted at different depths. In particular, distortions are measured for points lying on three spheres 402, 404, 406 with a respective radius of 100 cm, 200 cm, and 400 cm. Only a third of each sphere 402, 404, 406 is shown due to the periodicity of the distortions. Both the true position of the points (shown in solid lines) and distorted positions (shown in dashed lines) are shown, with the distorted positions shown using a ball whose radius is proportional to vertical disparity. A constant scene depth of 200 cm is assumed so that there is no distortion for points lying on the sphere 404 of radius 200 cm.

On FIG. 8, vertical parallax artifacts can be seen at eye level 408, causing a separation between the top and bottom hemispheres. A perceptual singularity is also present for scene points on the y-axis due to the fact that the observer can look directly upwards or downwards with an arbitrary eye orientation with respect to eye level 408. A spherical display should therefore provide at its zenith and nadir only one scene depth at screen distance (i.e. with zero disparity).

In order to reduce distortions and improve stitching quality, it is proposed to estimate scene depth prior to proceeding with the stitching process. Multiple camera views of the spherical omnipolar camera setup of FIG. 1A, 1B, or 1C can be used for depth estimation. Scene depths estimation can in turn improve the stitching quality, especially the vertical alignment at eye level (as in 408 in FIG. 8) where two hemispherical omnipolar images meet. Indeed, for stitching, points in the image need to be projected into world points, as discussed above. However, the lack of knowledge of the depth of each image point causes parallax at the borders between two hemispheres, as also discussed above with reference to FIG. 8. If scene depths are known or well estimated, the seam that occurs at the eye level between the two hemispherical omnipolar camera setups of FIG. 1A, 1B, or 1C can be removed.

Figure 9A:
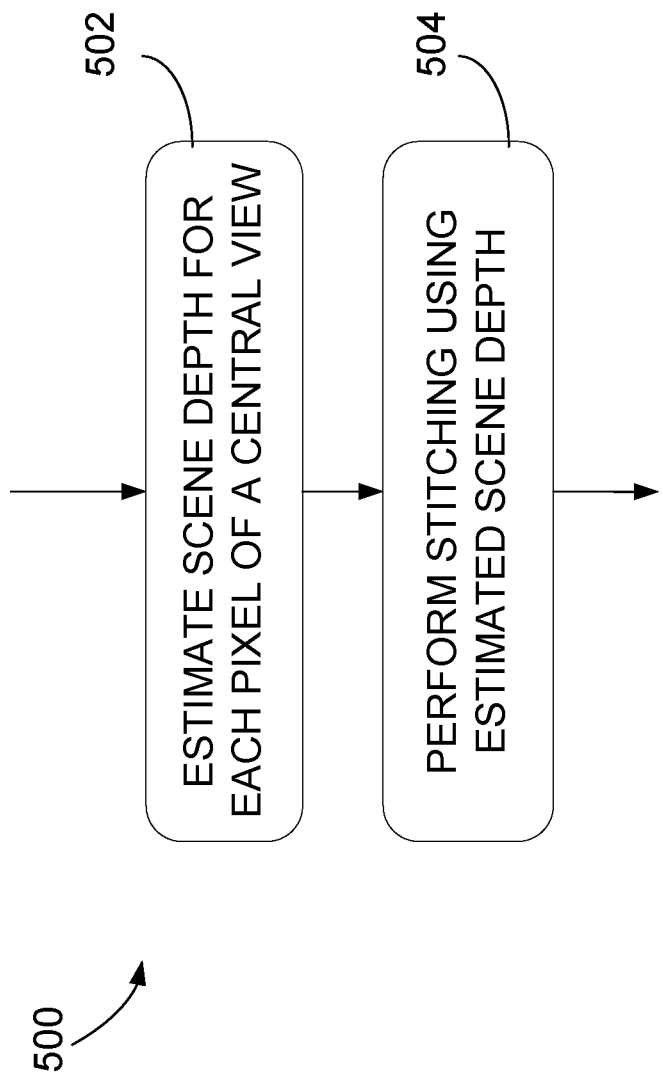
FIG. 9a is a flowchart illustrating an exemplary method for spherical omnipolar imaging, in accordance with one embodiment.

FIG. 9a illustrates an exemplary method 500 for spherical omnipolar imaging, in which scene depth is estimated to improve stitching quality, as discussed above. The method 500 may be implemented in the computing device 20 of FIG. 2 and comprises estimating scene depth (i.e. a position in the world) at step 502. Using the estimated scene depth, stitching can be performed at step 504, as discussed above with reference to FIGS. 3a to 3d and 4a to 4c.

In one embodiment, scene depths are estimated at step 502 by computing, for each pixel of the output image, several stereo matching costs that each correspond to one of several possible scene depths (also referred to as depth samples of a depth map). Let M be the number of depth samples $Z_k$, with k∈[0,M−1], and let the range of depths be bounded by parameters $Z_{min}$ and $Z_{max}$. Each depth sample $Z_k$ is then computed as:

$$Z_k = Z_{max} - \beta(Z_{max} - Z_{min}) \quad (12)$$

where β is a parameter varying in [0,1] that depends on k and is given by:

$$\beta = \frac{1 - \frac{1}{1+k}}{1 - \frac{1}{M}} \quad (13)$$

The values of the parameters $Z_{min}$ and $Z_{max}$ can be user-defined and determined as a function of the application and of the type of scene captures by the cameras. For example, for an outdoors scene, $Z_{min}$ may be set to 50 cm and $Z_{max}$ to 20 m while for an indoors scene, $Z_{min}$ may be set to 15 cm and $Z_{max}$ to 5 m. It should be understood that other parameter values may apply.

Figure 9B:
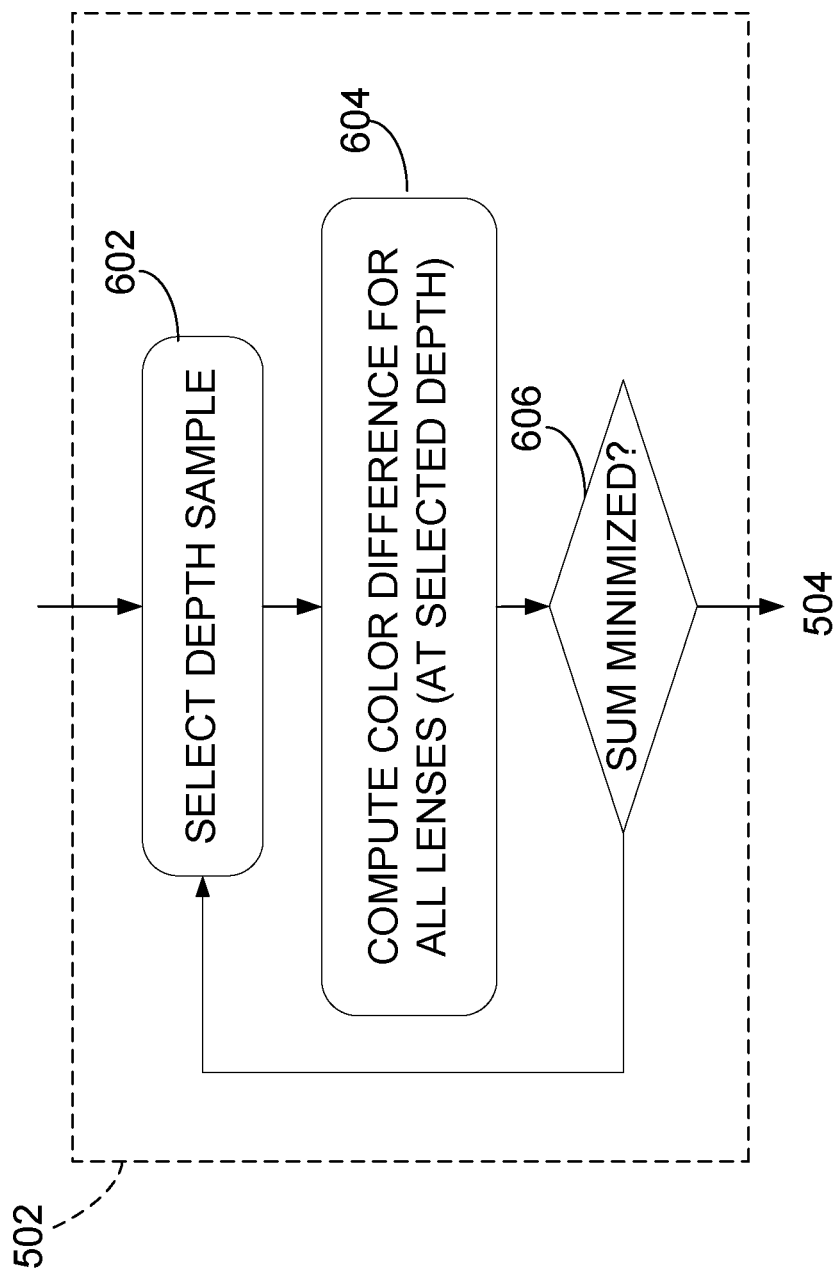

Using the above modeling of the depth samples $Z_k$ allows to achieve a constant pixel distance between corresponding image disparities. Referring to FIG. 9B, once a depth sample $Z_k$ has been selected at step 602, a matching cost that sums the pixel differences for all pairs of lenses (in the six-lens setups of FIGS. 1A, 1B, and 1C) can then be computed at step 604 as follows:

$$\text{Cost}(p,k) = \frac{1}{\|V(,)\|} \sum_{i=1}^{N} \sum_{j=i}^{N} \text{Abs}\left(V(p_{c_i}^k), V(p_{c_j}^k)\right) \quad (14)$$

Where N is the number of lenses (here N=6), $p_{c_i}^k$ represents the pixel p (in the output view) projected in the world (e.g. once) at depth $Z_k$ using equations (6) and (9) above (as illustrated in FIG. 5a) and re-projected back into the image of each lens i (or $c_i$) (e.g. re-projected six (6) times) using equations (1) and (2) above. The function V( ) returns the corresponding image intensity only if the pixel is visible within the field of view and returns "undefined" otherwise. $\|V(,)\|$ represents the number of all lens pairs for which both $p_{c_i}^k$ and $p_{c_j}^k$ are visible.

Using the cost computed in equation (14) for each depth sample $Z_k$, it is possible to determine whether the colors seen by all lens (e.g. the six lenses of FIG. 1A, 1B or 1C) match or differ. Matching colors imply that, at the given depth, the rendered images (and accordingly the stitching) are accurate for all lenses. At a given depth $Z_k$, the colors are said to match if the pixel difference for all pairs of lenses is minimum, i.e. Cost(p,k) is minimized. Therefore, the method determines at step 606 whether the sum computed in equation (14) is minimized. If this is the case, it is determined that proceeding with stitching at this depth $Z_k$ will improve the stitching alignment. The method 500 may then proceed with the stitching step 504, using the depth $Z_k$ with minimum cost as the value for the depth Z in equation (9). Otherwise, if it is determined at step 606 that the pixel difference is not minimum at depth $Z_k$, i.e. the sum is not minimized, the method flows back to step 602 where a new depth sample is selected. Step 604 is then repeated where a new value for Cost(p,k) is computed by applying equation (14) for the new depth sample. Step 606 is then repeated and the method will only proceed to the next step 504 once it is determined that the sum computed by applying equation (14) is minimized for the currently selected depth sample $Z_k$.

In some embodiments, in order to improve accuracy, the proposed depth estimation technique may not only comprise computing the minimum matching cost for a given pixel p but may also comprise taking into consideration the matching costs computed for pixels neighboring pixel p. In this case, smoothing constraints may be added on the depth maps in real-time. For example, upon computing matching costs for a given pixel p (step 604), it may be determined that the matching cost for pixel p is minimized at a depth of 2 m. However, upon computing the matching costs for neighbors to pixel p, it may be determined that the matching cost for all neighboring pixels is minimized at a depth of 5 m. Therefore, it may be concluded that selecting a value of 5 m as the final depth would prove more accurate than if the value of 2 m was selected, and would therefore improve stitching alignment.

It should be understood that a low resolution depth map may be sufficient to improve the stitching alignment. Indeed, using a depth value that minimizes the matching costs may provide visually appealing results. It should also be noted that, because several depth samples $Z_k$ are typically tested prior to arriving at a minimum matching cost for the pixel p, the distance between $p_{c_i}^k$ and $p_{c_i}^{k+1}$ (obtained when re-projecting pixel p back into the image of lens i (or $c_i$)) may vary from one computation performed at a given depth sample $Z_k$ to the next. In particular, the distance between samples $p_{c_i}^k$ and $p_{c_i}^{k+1}$ be larger than 1 if the number M of depth samples $Z_k$ is small. This may in turn result in some pixels being skipped in the different lens views, i.e. after the pixel p is re-projected back into the lens images at the next depth $Z_k$. Thus, in order to avoid this issue, the projection $p_{c_i}^k$ may be computed by taking into consideration a region of pixels around the pixel p (rather than considering pixel p only). The size of the region may vary depending on the application and on the type of scene captured by the lenses. In one embodiment, the region may be set to cover at least half of the distance between $p_{c_i}^k$ and $p_{c_i}^{k+1}$. This may be determined by averaging the intensities on a line joining $p_{c_i}^k$ and $p_{c_i}^{k+1}$.

In addition, if $Z_{min}$ is small, significant changes in scale may occur between the different lens views. This may in turn affect the costs computed in equation (14) since an object of a given resolution or scale (e.g. of 20×20 pixels) would have a different impact on the costs than an object having a lower resolution (e.g. of 10×10 pixels). Indeed, a given lens typically does not perceive the visual information at the same scale as a neighboring lens. A lens close to a given object would see the object with a better resolution than a lens further away from the object. For instance, a high frequency pattern comprising black and white strips may be seen as such by a first lens but perceived as being a grey pattern by a second lens (because black and white colors are averaged in each pixel). The matching cost would therefore be higher given the color difference between grey and black (or white). To alleviate this issue, a region greater than a single pixel would be defined (i.e. averaged) in the first lens, allowing to compare grey to grey. Therefore, the region of pixels around the pixel p may not be defined by projecting the pixel p with respect to its center but instead by projecting the pixel four (4) times with respect to its corners. The sample $p_{c_i}^k$ is then computed by averaging the intensities inside a rectangle bounding the re-projected world volume defined by the pixel p projected at depths $Z_k$ and $Z_{k+1}$. In this manner, changes in scale can be taken into account.

Although reference is made herein to domes or spherical screens (i.e. to display of left and right images as a spherical view), it should be understood that captured images may be formatted for display in a rectilinear view, e.g. on a monitor display, in a cylindrical view, e.g. on a cylindrical screen or as a video-projection, on a head-mounted display, e.g. in an OculusRift view, or other suitable format known to those skilled in the art. Thus, a variety of screens or displays may apply. The stereo images may be encoded as anaglyphs, such as red/cyan anaglyphs, or the like, (e.g. when using a dome or monitor display) or left/right images may be positioned side by side (e.g. when using a head-mounted display). Users may choose the direction of their gaze by rotating their head or by software control.

It should be noted that the present invention can be carried out as a method, can be embodied in a system, and/or on a computer readable medium. The embodiments of the invention described above are intended to be exemplary only. The scope of the invention is therefore intended to be limited solely by the scope of the appended claims.

The invention claimed is:

1. An imaging device comprising:
   a camera assembly having at least one camera and at least six image sensors, and having a first set of lenses and a second set of lenses operatively connected to the image sensors, the first set of lenses and the second set of lenses each arranged to capture a substantially 360 degree by 180 degree field of view;
   the first set of lenses comprising at least three wide angle lenses at a first baseline height oriented in a first direction, positioned substantially equidistant about a first circle, and arranged to capture input images for a first portion of the field of view;
   the second set of lenses comprising at least three wide angle lenses at a second baseline height oriented in a second direction substantially opposite to the first direction, positioned substantially equidistant about a second circle substantially concentric with and having a substantially same diameter as the first circle, and arranged to capture input images for a second portion of the field of view, the first portion and the second portion forming the substantially 360 degree by 180 degree field of view;
   a mounting apparatus for retaining the camera assembly and the first and second set of lenses in a fixed position; and
   a computing device operatively connected to the camera assembly and configured for generating the substantially 360 degree by 180 degree view as captured by one of the first set of lenses and the second set of lenses by:
   receiving the input images;
   constructing output images for left and right eye views by, for each pixel of the output images:
      projecting the pixel from an image coordinate system to a world coordinate system at a scene depth to obtain a world point;
      determining which one of the first set of lenses and the second set of lenses the world point corresponds to;
      selecting one lens from the one of the first set of lenses and the second set of lenses to which the world point corresponds, the selected lens having a camera point in a camera coordinate system that corresponds to the world point; and
      mapping the corresponding camera point from the selected lens to the pixel; and rendering the 360 degree by 180 degree view from the output images.

2. The device of claim 1, wherein the camera assembly comprises three cameras, each one of the three cameras having one lens from the first set of lenses and one lens from the second set of lenses attached thereto, and two of the six image sensors.

3. The device of claim 1, wherein the camera assembly comprises one camera and one image sensor per lens.

4. The device of claim 1, wherein the wide angle lenses are fisheye lenses.

5. The device of claim 1, wherein the computing device is further configured for determining the scene depth as one of an estimated scene depth and a parameterized scene depth.

6. The device of claim 5, wherein determining the scene depth comprises determining the scene depth at regions around a transition between the first set of lenses and the second set of lenses.

7. The device of claim 5, wherein determining the scene depth comprises determining a distance at which a measure of pixel color similarity for groups of at least two pixels from groups of at least two lenses is minimized.

8. The device of claim 1, wherein determining whether the world point corresponds to the first set of lenses or to the second set of lenses comprises determining a vertical component of the world point and associating a positive vertical component to first the set of lenses and a negative vertical component to the second set of lenses.

9. A method for generating a substantially 360 degree by 180 degree view from images taken by an imaging device, the method comprising:
acquiring input images from a camera assembly of the imaging device, the camera assembly having at least one camera and at least six image sensors, and having a first set of lenses and a second set of lenses connected to the image sensors, the first set of lenses positioned at a first baseline height substantially equidistantly about a first circle and facing in a first direction, the second set of lenses positioned at a second baseline height substantially equidistantly about a second circle substantially concentric with and having a substantially same diameter as the first circle and facing in a second direction substantially opposite to the first direction;
constructing output images for left and right eye views by, for each pixel of the output images:
projecting the pixel from an image coordinate system to a world coordinate system at a scene depth to obtain a world point;
determining which one of the first set of lenses and the second set of lenses the world point corresponds to;
selecting one lens from the one of the first set of lenses and the second set of lenses to which the world point corresponds, the selected lens having a camera point in a camera coordinate system that corresponds to the world point; and
mapping the corresponding camera point from the selected lens to the pixel; and
rendering the 360 degree by 180 degree view from the output images.

10. The method of claim 9, further comprising determining the scene depth as one of an estimated scene depth and a parameterized scene depth.

11. The method of claim 10, wherein determining the scene depth comprises determining the scene depth at regions around a transition between the first set of lenses and the second set of lenses.

12. The method of claim 10, wherein determining the scene depth comprises determining a distance at which a measure of pixel color similarity for groups of at least two pixels from groups of at least two lenses is minimized.

13. The method of claim 12, wherein determining the distance at which the difference is minimized comprises determining the distance for neighboring ones of the pairs of the groups of two or more pixels.

14. The method of claim 12, wherein determining the distance at which the difference is minimized comprises taking into account scale differences between neighboring lenses by adjusting a resolution of images obtained from at least one of the at least two lenses.

15. The method of claim 10, wherein determining the scene depth comprises determining the scene depth at which colors seen by the first set of lenses and the second set of lenses match.

16. The method of claim 10, wherein determining the scene depth comprises using a stereo matching method selected from a group comprising direct matching, dynamic programming, and semi-global matching.

17. The method of claim 10, wherein determining the scene depth comprises selecting the scene depth from a predetermined range of maximum and minimum scene depths.

18. The method of claim 9, wherein determining whether the world point corresponds to the first set of lenses or to the second set of lenses comprises determining a vertical component of the world point and associating a positive vertical component to the first set of lenses and a negative vertical component to the second set of lenses.

19. The method of claim 9, wherein selecting one lens from the corresponding one of the first set of lenses and the second set of lenses comprises determining a horizontal angular position of the world point and selecting the lens for which the horizontal angular position falls into a region of the input image defined by epipolar lines joining a center point of the lens with center points of neighboring lenses.

* * * * *